United States Patent
Lee et al.

(10) Patent No.: US 10,286,485 B2
(45) Date of Patent: May 14, 2019

(54) LASER PROCESSING DEVICE AND LASER PROCESSING METHOD

(71) Applicant: EO TECHNICS CO., LTD., Anyang-si, Gyeonggi-do (KR)

(72) Inventors: Dong Jun Lee, Seoul (KR); Dong Won Hyun, Suwon-si (KR); Byung Oh Kim, Seoul (KR)

(73) Assignee: EO TECHNICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/757,529

(22) PCT Filed: Aug. 11, 2016

(86) PCT No.: PCT/KR2016/008840
§ 371 (c)(1),
(2) Date: Mar. 5, 2018

(87) PCT Pub. No.: WO2017/039171
PCT Pub. Date: Mar. 9, 2017

(65) Prior Publication Data
US 2018/0339363 A1    Nov. 29, 2018

(30) Foreign Application Priority Data
Sep. 3, 2015 (KR) .................. 10-2015-0124938

(51) Int. Cl.
*G01N 21/00* (2006.01)
*B23K 26/046* (2014.01)
(Continued)

(52) U.S. Cl.
CPC ............ *B23K 26/046* (2013.01); *B23K 26/02* (2013.01); *B23K 26/03* (2013.01); *B23K 26/032* (2013.01);
(Continued)

(58) Field of Classification Search
CPC ........ B23K 26/04; B23K 26/03; B23K 26/06; G01B 11/02; G01B 11/06; G01B 11/14;
(Continued)

(56) References Cited

U.S. PATENT DOCUMENTS

| | | | |
|---|---|---|---|
| 8,134,099 B2 | 3/2012 | Nakano et al. | |
| 8,198,564 B2 | 6/2012 | Unrath et al. | |

(Continued)

FOREIGN PATENT DOCUMENTS

| | | | |
|---|---|---|---|
| CN | 103100797 A | 5/2013 | |
| JP | H08-21964 A | 1/1996 | |

(Continued)

OTHER PUBLICATIONS

International Search Report (PCT/ISA/210) dated Nov. 16, 2016, by the Korean Patent Office as the International Searching Authority for International Application No. PCT/KR2016/008840.

(Continued)

*Primary Examiner* — Abdullahi Nur
(74) *Attorney, Agent, or Firm* — Buchanan Ingersoll & Rooney PC

(57) ABSTRACT

The laser processing device includes: a measuring device configured to measure a change in a height of an object and including a first light source configured to emit probe light, a first light focusing unit configured to focus the probe light on the object, a light sensing unit configured to detect a change in the probe light reflected from a reflective surface of the object and including a Shack-Hartmann sensor, and a calculation unit configured to calculate the change in the height of the object by using the change in the reflected light detected by the light sensing unit; a second light source configured to emit laser light for processing to the object; and a focus adjusting device configured to adjust a focus of the laser light emitted to the object by using the change in (Continued)

the height of the object to be processed measured by the measuring device.

21 Claims, 18 Drawing Sheets

(51) Int. Cl.

| | | |
|---|---|---|
| B23K 26/02 | (2014.01) | |
| B23K 26/03 | (2006.01) | |
| B23K 26/04 | (2014.01) | |
| B23K 26/06 | (2014.01) | |
| B23K 26/08 | (2014.01) | |
| G01B 11/06 | (2006.01) | |
| G01B 11/14 | (2006.01) | |
| G02B 26/08 | (2006.01) | |
| G02B 27/14 | (2006.01) | |
| G02B 7/28 | (2006.01) | |

(52) U.S. Cl.
CPC .............. *B23K 26/04* (2013.01); *B23K 26/06* (2013.01); *B23K 26/0648* (2013.01); *B23K 26/08* (2013.01); *G01B 11/06* (2013.01); *G01B 11/0608* (2013.01); *G01B 11/14* (2013.01); *G02B 7/28* (2013.01); *G02B 26/0875* (2013.01); *G02B 27/141* (2013.01)

(58) Field of Classification Search
CPC ........ G02B 27/14; G02B 26/08; G01N 21/47; G01N 21/55; A61B 3/107; A61B 3/00; A61B 3/03
See application file for complete search history.

(56) References Cited

U.S. PATENT DOCUMENTS

| | | |
|---|---|---|
| 8,982,339 B2 | 3/2015 | Schönleber et al. |
| 2007/0236701 A1* | 10/2007 | Neal .................... A61B 3/1005 356/512 |
| 2013/0020511 A1 | 1/2013 | Kameda et al. |
| 2016/0329246 A1 | 11/2016 | Osajima et al. |

FOREIGN PATENT DOCUMENTS

| | | |
|---|---|---|
| JP | 2000-009991 A | 1/2000 |
| KR | 10-2012-0112853 A | 10/2012 |
| KR | 10-2014-0092411 A | 7/2014 |
| KR | 10-2014-0140206 A | 12/2014 |
| KR | 10-1514249 B | 4/2015 |
| TW | 201012579 A | 4/2010 |
| TW | 201323124 A | 6/2013 |
| WO | 2006/041191 A1 | 4/2006 |

OTHER PUBLICATIONS

Written Opinion (PCT/ISA/237) dated Nov. 16, 2016, by the Korean Patent Office as the International Searching Authority for International Application No. PCT/KR2016/008840 with English translation from Global Dossier.
Partial English translation of Office Action dated May 10, 2018, by the Taiwanese Patent Office in corresponding Taiwanese Patent Application No. 105126299. (11 pages).
Partial English translation of Office Action dated Aug. 8 2018, by the Taiwanese Patent Office in corresponding Taiwanese Patent Application No. 105126299. (10 pages).
Chinese Office Action dated Mar. 1, 2019 in corresponding CN Application No. 201680051147.0 (9 pages).

* cited by examiner

LASER PROCESSING DEVICE AND LASER PROCESSING METHOD

TECHNICAL FIELD

The present invention relates to a laser processing device and a laser processing method, and more particularly, to a laser processing device and a laser processing method that may automatically adjust a focus on a processing target point during a laser processing operation.

BACKGROUND ART

A Shack-Hartmann sensor that is a device for measuring distortions or aberrations of a wavefront of light reflected by a specific region in an astronomical telescope, an optometer, or the like is generally used to measure a shape of a surface in the specific region by using the measured distortions or aberrations of the wavefront.

However, a Shack-Hartmann sensor has a limitation in that a change in an overall thickness or an overall height of an object may not be measured. For example, when a thickness difference between wafers having different thicknesses and stacked on a reference surface such as a surface of a stage is to be measured, a Shack-Hartmann sensor cannot measure the thickness difference or may have great difficulty in measuring the thickness difference. This is because a size of probe light emitted to the object has to be large enough to include both the wafers and the reference surface and a height difference between the reference surface and a measurement surface when the reference surface becomes a reflective surface for the probe light should not exceed a measurement limit (e.g., about 30 times a wavelength of the probe light) of the Shack-Hartmann sensor.

DETAILED DESCRIPTION OF THE INVENTION

Technical Problem

According to an embodiment of the present invention, there are provided a laser processing device and a laser processing method that may automatically adjust a focus on a processing target point during a laser processing operation.

Technical Solution

According to an aspect of the present invention, there is provided a laser processing device including: a measuring device configured to measure a change in a height of an object to be processed and including a first light source configured to emit probe light for measurement, a first light focusing unit configured to focus the probe light and emit the focused probe light to the object to be processed, a light sensing unit configured to detect a change in reflected light that is the probe light reflected from a reflective surface of the object to be processed and including a Shack-Hartmann sensor, and a calculation unit configured to calculate the change in the height of the object to be processed by using the change in the reflected light detected by the light sensing unit; a second light source configured to emit laser light for processing to the object to be processed; and a focus adjusting device configured to adjust a focus of the laser light emitted to the object to be processed by using the change in the height of the object to be processed measured by the measuring device.

The laser light emitted from the second light source may pass through the first light focusing unit and may be emitted to the object to be processed.

The focus adjusting device may include a driver configured to move the first light focusing unit upward and downward relative to the object to be processed or move the measuring device upward and downward relative to the object to be processed. The focus adjusting device may further include a controller connected to the calculation unit and configured to control an upward and downward movement of the driver.

A dichroic mirror configured to transmit any one from among the probe light and the laser light and reflect remaining light may be provided between the first and second light sources and the first light focusing unit.

A beam splitter configured to transmit any one from among the probe light and the reflected light and reflect remaining light may be provided between the first light source and the dichroic mirror. A wave plate and a bandpass filter may be further provided between the dichroic mirror and the beam splitter.

The laser processing device may further include a second light focusing unit configured to focus the laser light emitted from the second light source and emit the focused laser light to the object to be processed.

The focus adjusting device may include a driver configured to move the second light focusing unit upward and downward relative to the object to be processed or move the second light focusing unit and the measuring device upward and downward relative to the object to be processed. The focus adjusting device may further include a controller connected to the calculation unit and configured to control an upward and downward movement of the driver.

A beam splitter configured to transmit any one from among the probe light and the reflected light and reflect remaining light may be provided between the first light source and the first light focusing unit.

The Shack-Hartmann sensor may be configured to detect a change in a wavefront of the reflected light. The calculation unit may be further configured to calculate the change in the height of the object to be processed by using Zernike polynomials that represent the change in the reflected light detected by the light sensing unit as a formula. The change in the height of the object to be processed may correspond to a change in a coefficient value of a defocus term of the Zernike polynomials.

According to another aspect of the present invention, there is provided a laser processing method of processing an object to be processed by using a laser processing device including: a measuring device including a first light source configured to emit probe light, a first light focusing unit configured to focus the probe light and emit the focused probe light to the object to be processed, a light sensing unit configured to detect a change in reflected light that is the probe light reflected from the object to be processed and including a Shack-Hartmann sensor, and a calculation unit configured to calculate a change in a height of the object to be processed by using the change in the reflected light; a second light source configured to emit laser light; and a focus adjusting device configured to adjust a focus of the laser light, the method including: measuring the change in the height of the object to be processed using the measuring device; and adjusting the focus of the laser light emitted to the object to be processed by using the change in the height of the object to be processed measured by the measuring device using the focus adjusting device.

Advantageous Effects of the Invention

According to an embodiment of the present invention, in a measuring device, a light sensing unit including a Shack-Hartmann sensor may detect a change in a wavefront of reflected light reflected from an object to be processed and a calculation unit may measure a change in a height of the object to be processed by calculating a coefficient value of a defocus term by using the change in the wavefront of the reflected light. Accordingly, when the height of the object to be processed is changed during a laser processing operation, the measuring device may measure a change in the height of the object to be processed in real time, and a focus may be automatically measured by using the measured change in the height of the object to be processed, thereby making it possible to accurately perform the laser processing operation in real time.

MODE OF THE INVENTION

Figure 1:
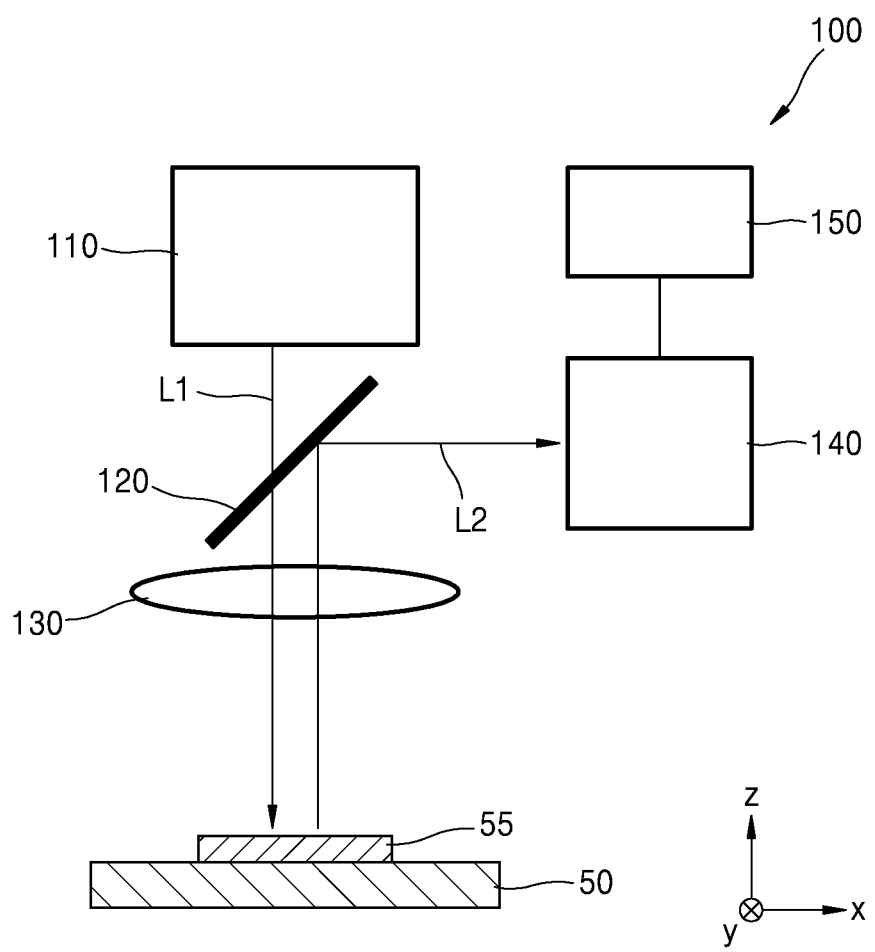
FIG. 1 is a view schematically illustrating a measuring device according to an example embodiment of the present invention.

At least one embodiment will be described more fully with reference to the accompanying drawings, in which embodiments are shown. The embodiments may, however, be embodied in many different forms and should not be construed as being limited to the examples set forth herein; rather these embodiments are provided so that this disclosure will be thorough and complete, and will fully convey the present invention to one of ordinary skill in the art. In the drawings, like reference numerals denote like elements, and sizes or thicknesses of elements may be exaggerated for clarity. It will also be understood that when a material layer is referred to as being "on" another layer or a substrate, the material layer can be directly on the other layer or the substrate, or intervening layers may also be present therebetween. A material of each layer in the following embodiments is an example, and thus other materials may be used.

FIG. 1 is a view schematically illustrating a measuring device 100 according to an example embodiment of the present invention. The measuring device 100 of FIG. 1 may measure a change in a thickness or a height of an object or may measure a shape of the object.

Referring to FIG. 1, the measuring device 100 may be provided over a target object 55 loaded on a stage 50. The measuring device 100 according to the present embodiment may include a light source 110, a light focusing unit 130, a light sensing unit 10, and a calculation unit 150. A beam splitter 120 may be further provided between the light source 110 and the light focusing unit 130.

The light source 110 emits probe light L1 to the target object 55 to measure a height of the target object 55. The probe light L1 emitted from the light source 110 may be transmitted through the beam splitter 120. The beam splitter 120 may transmit any one from among the probe light L1 and reflected light L2 described below and may reflect the remaining light. FIG. 1 exemplarily illustrates that the beam slitter 120 transmits the probe light L1 and reflects the reflected light L2. However, the present embodiment is not limited thereto, and the beam splitter 120 may be configured to reflect the probe light L1 and transmit the reflected light L2. The probe light L1 passing through the beam splitter 120 is focused by the light focusing unit 130, and then is emitted to the target object 55 loaded on the stage 50.

The probe light L1 focused by the light focusing unit 130 and emitted to the target object 55 is reflected from a reflective surface of the target object 55. The reflected light L2 reflected from the target object 55 may pass through the light focusing unit 130 and may be reflected from the beam splitter 120, and then may be detected by the light sensing unit 140. In the present embodiment, the light sensing unit 140 may include a Shack-Hartmann sensor for detecting a change in a wavefront of the reflected light L2. The Shack-Hartmann sensor may detect the change in the wavefront of the reflected light L2 for the probe light L1 by measuring distortions or aberrations of the wavefront of the reflected light L2.

The calculation unit 150 may measure a change in a height of the reflective surface of the target object 55 by using the change in the reflected light L2 detected by the light sensing unit 140. In detail, when the light sensing unit 140 detects the change in the wavefront of the reflected light L2, the light sensing unit 140 applies an electrical signal corresponding to the change in the wavefront to the calculation unit 150. The calculation unit 150 may measure the change in the height of the reflective surface of the target object 55 by representing the change in the wavefront of the reflected light L2 detected by the light sensing unit 140 by using Zernike polynomials that are a mathematical model. The Zernike polynomials may include a plurality of terms, and the terms constituting the Zernike polynomials which describe optical aberrations are orthogonal to one another. A coefficient value of a defocus term from among the terms constituting the Zernike polynomials may be used to determine the change in the height or a thickness of the target object 55, which will be described below in detail.

The measuring device 100 may move upward and downward relative to the target object 55. For example, in FIG. 1, the measuring device 100 may move upward and downward in a z-direction or the stage 50 on which the target object 55 is loaded may move upward and downward in the z-direction. Also, both the measuring device 100 and the stage 50 may move in the z-direction.

Figure 2A:
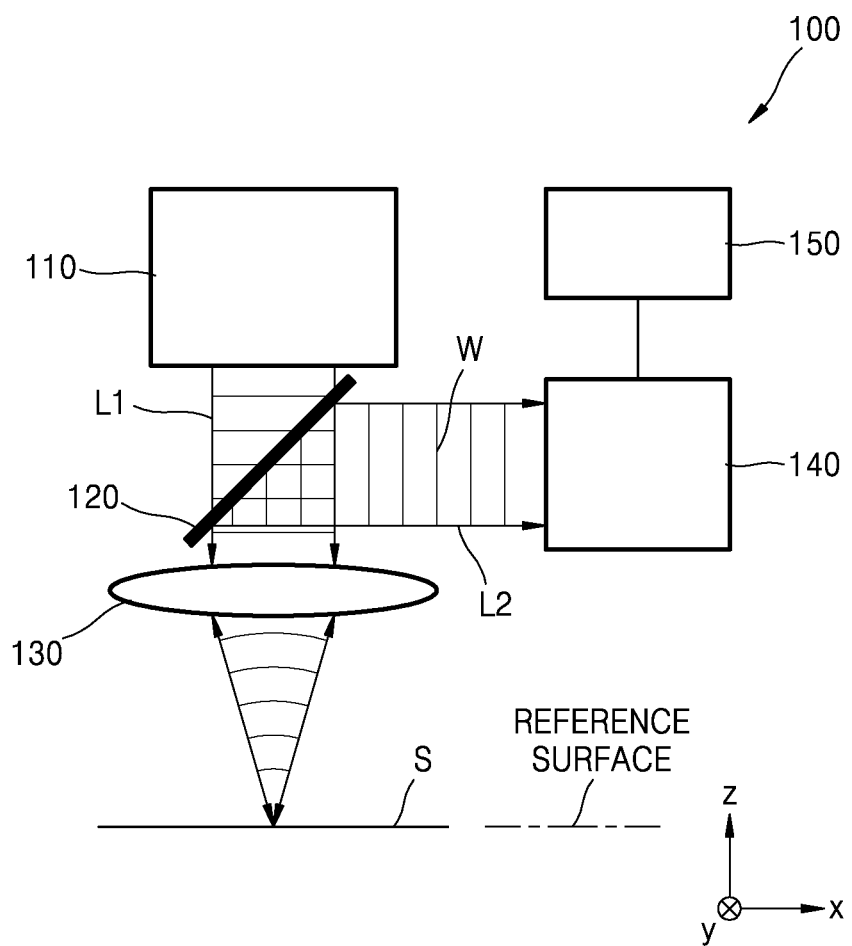
FIGS. 2A through 2C are views for explaining a principle of measuring a change in a thickness or a height of an object by using the measuring device of FIG. 1.
Figure 2B:
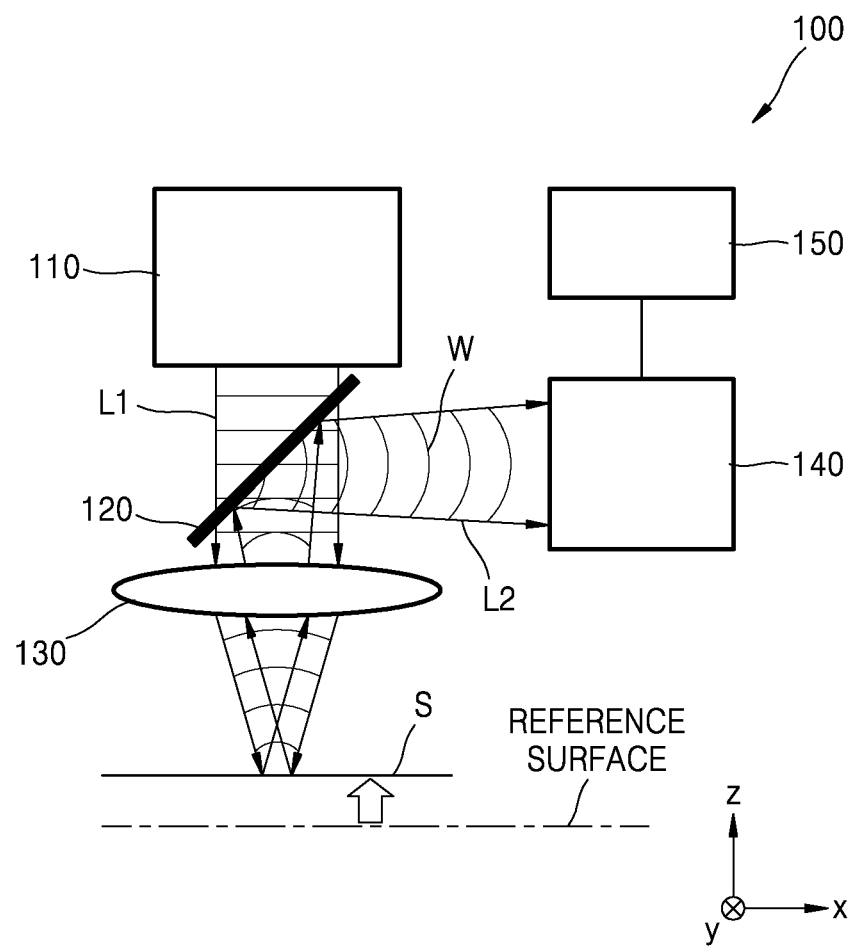
Figure 2C:
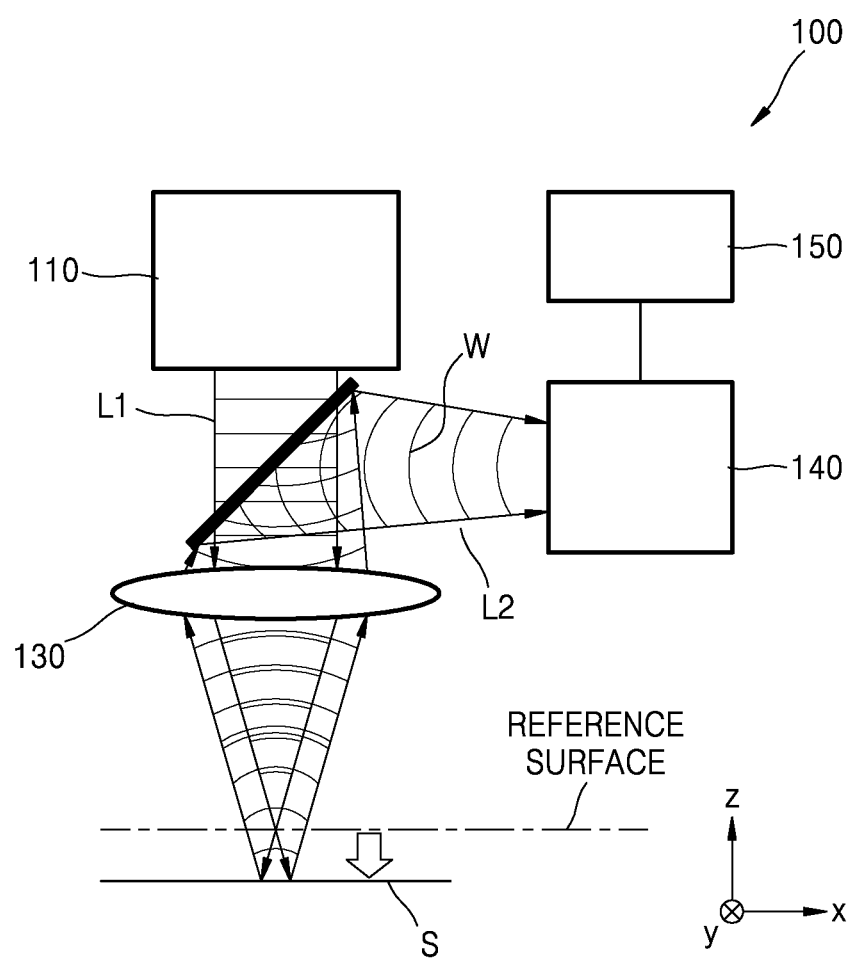

FIGS. 2A through 2C are views for explaining a principle of measuring a change in a thickness or a height of an object by using the measuring device 100 of FIG. 1.

In FIG. 2A, the probe light L1 emitted from the light source 110 is focused by the light focusing unit 130 and is incident on a reflective surface S, and then is reflected from the reflective surface S. Referring to FIG. 2, the probe light L1 emitted from the light source 110 and passing through the beam splitter 120 is focused by the light focusing unit 130, and then is incident on the reflective surface S. The probe light L1 may be focused on the reflective surface S to form a focusing point. Next, the probe light L1 may be reflected by the reflective surface S, and the reflected light L2 may be reflected by the beam splitter 120 and then may be incident on the light sensing unit 140.

The light sensing unit 140 including a Shack-Hartmann sensor may detect a change in a wavefront W of the reflected light L2 reflected from the reflective surface S. In FIG. 2A, since the wavefront W of the reflected light L2 reflected from the reflective surface S is a plane wavefront, like that of the probe light L1, there is no change in the wavefront W of the reflected light L2. As such, the reflective surface S with no change in the wavefront W of the reflected light L2 may be set as a reference surface for height measurement. A height of the reference surface may be determined to be, for example, "0".

As such, when there is no change in the wavefront W of the reflected light L2 reflected from the reflective surface S, a coefficient value of a defocus term in Zernike polynomials stored in the calculation unit 150 may be "0". In this case, a height of the reflective surface S may be determined to be "0" that is the same as the height of the reference surface.

In FIG. 2B, the probe light L1 emitted from the light source 110 is focused by the light focusing unit 130, is incident on the reflective surface S, and then is reflected. In FIG. 2B, the reflective surface S may be provided at a position higher than that of the reference surface, and in this case, a height of the reflective surface S may have a "positive (+)" value. Referring to FIG. 2B, the probe light L1 emitted from the light source 110 and passing through the beam splitter 120 is focused by the light focusing unit 130 and then is incident on the reflective surface S. Since the reflective surface S is at a position higher than that of the reference surface, the probe light L1 passing through the light focusing unit 130 may be defocused on the reflective surface S. The probe light L1 may be reflected by the reflective surface S, and the reflected light L2 may be reflected by the beam splitter 120 and then may be incident on the light sensing unit 140. In this case, the reflected light L2 reflected by the beam splitter 120 may be diverged and may be incident on the light sensing unit 140.

The light sensing unit 140 including the Shack-Hartmann sensor may detect a change in a wavefront of the reflected light L2 reflected from the reflective surface S. As shown in FIG. 2B, the wavefront W of the reflected light L2 reflected from the reflective surface S that is at a position higher than that of the reference surface may be changed into a convex shape and may be incident on the light sensing unit 140. As such, when the wavefront W of the reflected light L2 detected by the light sensing unit 140 is changed into the convex shape, a coefficient of a defocus term in Zernike polynomials stored in the calculation unit 150 may have a "positive (+)" value.

In FIG. 2C, the probe light L1 emitted from the light source 110 is focused by the light focusing unit 130, is incident on the reflective surface S, and then is reflected. In FIG. 2C, the reflective surface S is provided at a position lower than that of the reference surface, and in this case, a height of the reflective surface S may have a "negative (−)" value. Referring to FIG. 2C, the probe light L1 emitted from the light source 110 and passing through the beam splitter 120 is focused by the light focusing unit 130, and then is incident on the reflective surface S. Since the reflective surface S is provided at a position lower than that of the reference surface, the probe light L1 passing through the light focusing unit 130 may be defocused on the reflective surface S. The probe light L1 may be reflected by the reflective surface S, and the reflected light L2 may be reflected by the beam splitter 120 and then may be incident on the light sensing unit 140. In this case, the reflected light L2 reflected by the beam splitter 120 may be converged and may be incident on the light sensing unit 140.

The light sensing unit 140 including the Shack-Hartmann sensor may detect a change in a wavefront of the reflected light L2 reflected from the reflective surface S. As shown in FIG. 2C, the wavefront W of the reflected light L2 reflected from the reflective surface S that is at a position lower than that of the reference surface is changed into a concave shape and is incident on the light sensing unit 140. As such, when the wavefront W of the reflected light L2 detected by the light sensing unit 140 is changed into the concave shape, a coefficient of a defocus term in Zernike polynomials stored in the calculation unit 150 may have a "negative (−)" value.

Figure 3:
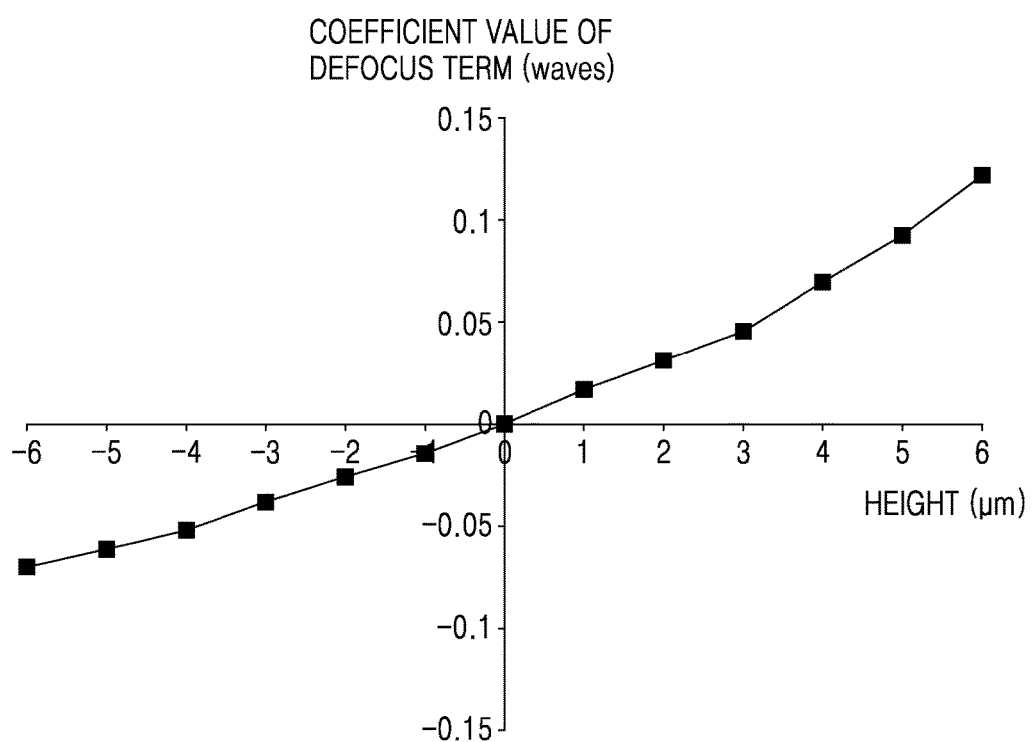
FIG. 3 is a view exemplarily illustrating a coefficient value of a defocus term calculated from a change in reflected light detected according to a height of a reflective surface in FIGS. 2A through 2C.

FIG. 3 is a view exemplarily illustrating a coefficient value of a defocus term calculated from a change in the reflected light L2 detected according to a height of the reflective surface S in FIGS. 2A through 2C.

Referring to FIG. 3, it is found that when a height of the reflective surface S is "0" that is the same as a height of a reference surface, a coefficient of a defocus term of Zernike polynomials is "0". It is found that when the height of the reflective surface S is greater than that of the reference surface and has a "positive (+)" value, the coefficient of the defocus term of the Zernike polynomials has a "positive (+)" value. In this case, as the height of the reflective surface S increases, a coefficient value of the defocus term gradually increases. In contrast, it is found that when the height of the reflective surface S is less than that of the reference surface and has a "negative (−)" value, the coefficient of the defocus term of the Zernike polynomials has a "negative (−)" value. In this case, as the height of the reflective surface decreases, the coefficient value of the defocus term gradually decreases. A change in the coefficient value of the defocus term according to a change in the height of the reflective surface S may be stored as calibration data in the calculation unit 150 of the measuring device 100 as described below.

A case where the reflective surface S when there is no change in the wavefront of the reflected light L2, that is, when the coefficient value of the defocus term is "0", is set as the reference surface for height measurement has been exemplarily described. However, the present embodiment is not limited thereto, and the reflective surface S when the coefficient value of the defocus term has a "positive (+)" or "negative (−)" value may be as the reference surface. Even in this case, the coefficient value of the defocus term may be changed as the height of the reflective surface S with respect to the reference surface is changed, and calibration data may be obtained by measuring a change in the height of the reflective surface by using the calculated change in the coefficient value of the defocus term.

Figure 4:
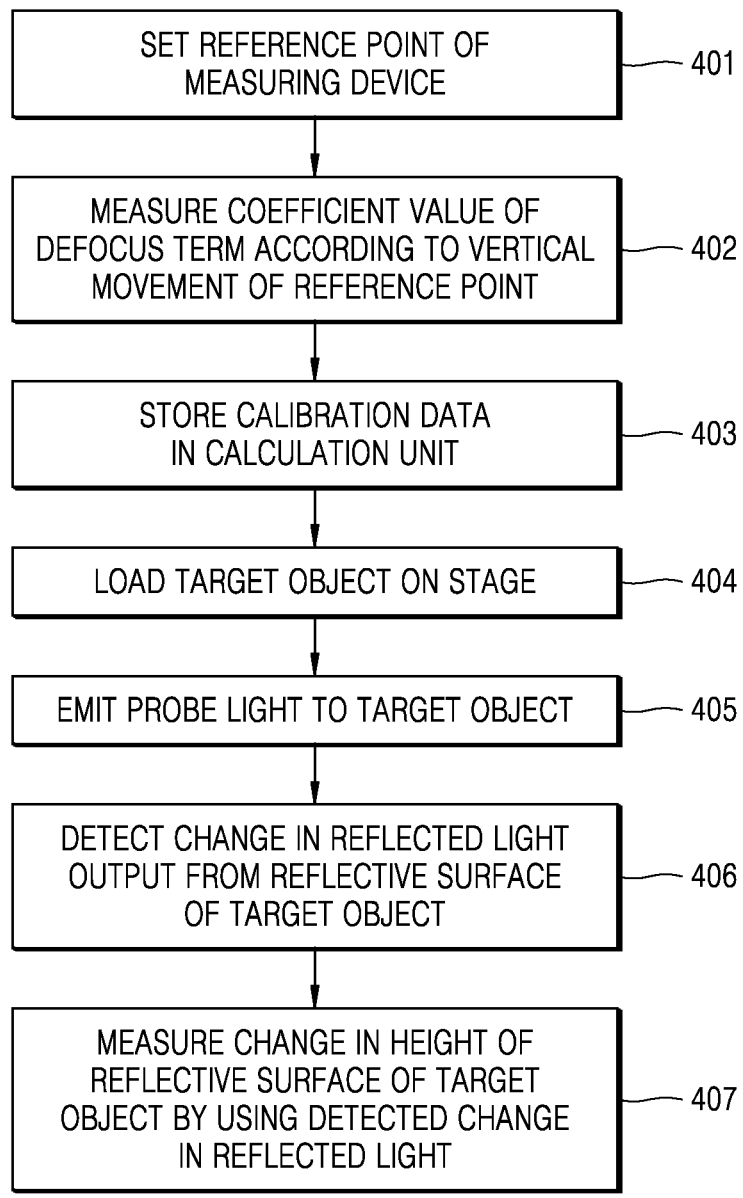
FIG. 4 is a flowchart for explaining a measuring method according to another example embodiment of the present invention.

FIG. 4 is a flowchart for explaining a measuring method according to another example embodiment of the present invention. FIG. 4 illustrates a method of measuring a change in a thickness or a height of an object by using the measuring device 100 of FIG. 1.

Referring to FIG. 4, in operation 401, a reference point of the measuring device 100 is set. The reference point may be set on a reference surface whose height is "0" as described above. The reference point may be set on a reflective surface of a reference object or a reflective surface of a stage as described below.

Next, in operation 402, a coefficient value of a defocus term according to a upward and downward movement of the reference point is measured. The upward and downward movement of the reference point may be performed by moving the reflective surface upward and downward relative to the reference surface as shown in FIGS. 2A through 2C, a wavefront of the reflected light L2 may be changed according to the upward and downward movement of the reference point, the change in the wavefront of the reflected light L2 may be detected by the light sensing unit 140, and then the coefficient value of the defocus term of Zernike polynomials stored in the calculation unit 150 may be measured by using the change in the wavefront of the reflected light L2. In operation 403, calibration data indicating a change in the measured coefficient value of the defocus term according to the upward and downward movement of the reference point is stored in the calculation unit 150.

Next, the target object 55 to be measured is loaded on the stage 50. The measuring device 100 is moved to a position of the reference point, and then the probe light L1 is emitted from the light source 110 to the target object 55. The probe light L1 emitted from the light source 110 may be transmitted through the beam splitter 120, and then may be focused by the light focusing unit 130 and may be emitted to the target object 55.

Next, the light sensing unit 140 detects the change in the wavefront of the reflected light L2 reflected from a reflective surface of the target object 55. In detail, the probe light L1 passing through the light focusing unit 130 is reflected by the reflective surface of the target object 55, and the reflected light L2 is incident on the light sensing unit 140. The reflected light L2 reflected by the reflective surface of the target object 55 may pass through the light focusing unit 130, may be reflected by the beam splitter 120, and then may be incident on the light sensing unit 140. The light sensing unit 140 including a shack-Hartmann sensor may detect the change in the wavefront of the reflected light L2.

Next, a change in a height of the reflective surface of the target object 55 is measured by using the change in the reflected light L2 detected by the light sensing unit 140. In detail, the change in the wavefront of the reflected light L2 detected by the light sensing unit 140 is input to the calculation unit 150, and the calculation unit 150 calculates the coefficient value of the defocus term of the Zernike polynomials by using the change in the wavefront of the reflected light L2. The change in the height of the reflective surface of the target object 55 with respect to the reference point may be measured by comparing the calculated coefficient value of the defocus term with the calibration data stored in the calculation unit 150. A thickness of the target object 55 may also be measured by using the measured change in the height of the reflective surface.

Figure 5A:
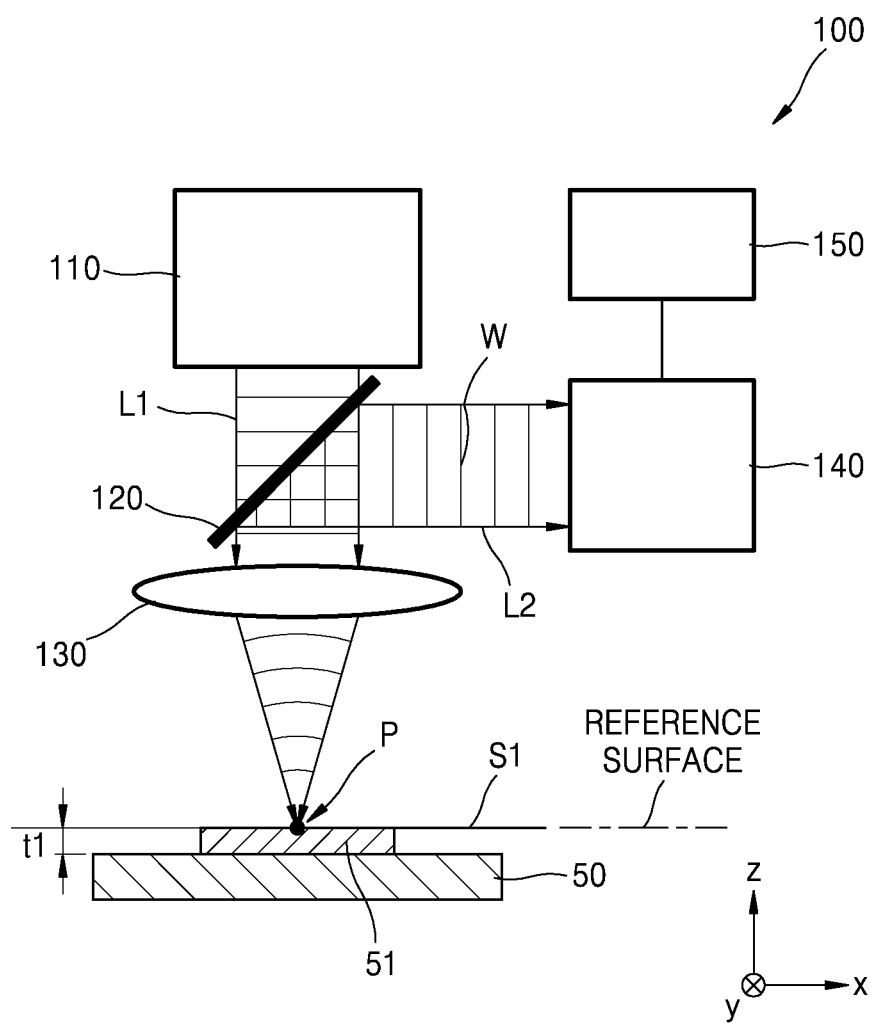
FIGS. 5A and 5B are views for explaining the specific example of the measuring method of FIG. 4.
Figure 5B:
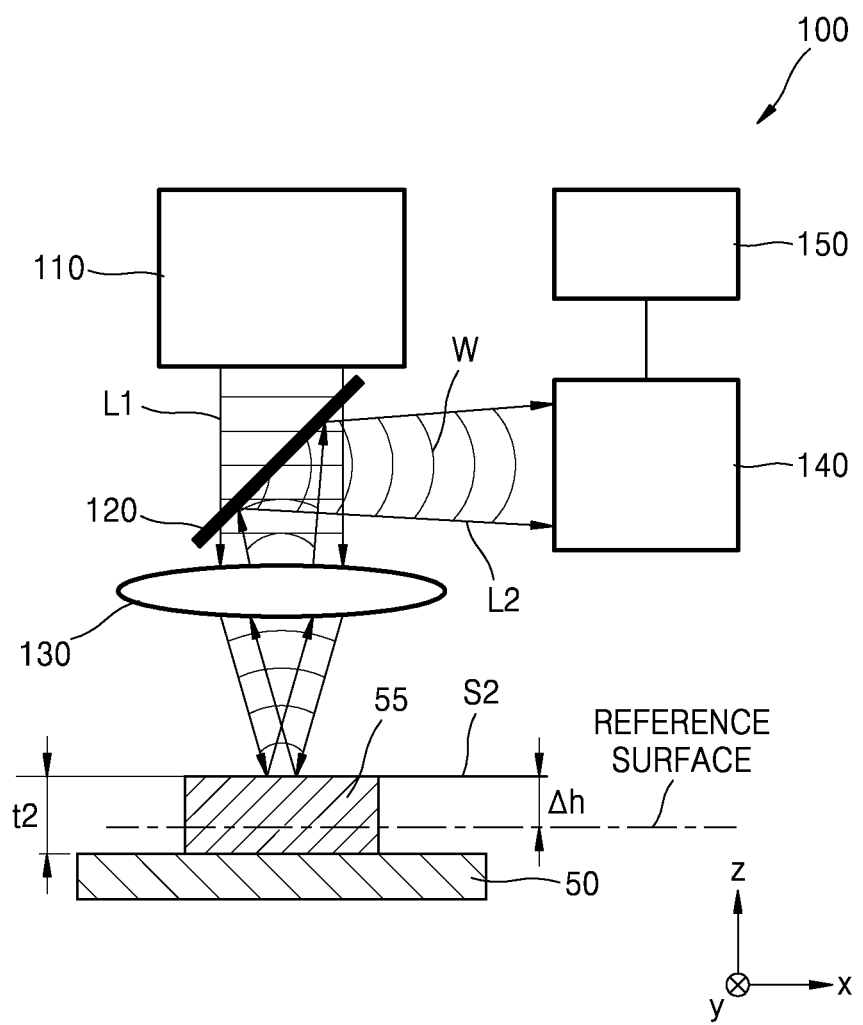

FIGS. 5A and 5B are views for explaining the specific example of the measuring method of FIG. 4.

Referring to FIG. 5A, a reference object 51 is loaded on the stage 50. The reference object 51 may have a given thickness t1. Next, a reference point P of the measuring device 100 is set. The reference point P of the measuring device 100 may be set on a reflective surface S1 of the reference object 51. Next, the probe light L1 emitted from the light source 110 of the measuring device 100 and transmitted through the beam splitter 120 is focused by the light focusing unit 130, and then is incident on the reflective surface S1 of the reference object 51. The probe light L1 may be reflected by the reflective surface S1, and the reflected light L2 may be reflected by the beam splitter 120 and then may be incident on the light sensing unit 140.

The light sensing unit 140 including a Shack-Hartmann sensor may detect a change in a wavefront of the reflected light L2 reflected from the reflective surface S1 of the reference object 51. In FIG. 5A, as shown in FIG. 2A, the wavefront W of the reflected light L2 reflected from the reflective surface S1 of the reference object 51 and incident on the light sensing unit 140 is a plane wavefront, and thus there is no change in the wavefront of the reflected light L2. As such, the reflective surface S1 of the reference object 51 with no change in the wavefront of the reflected light L2 may correspond to a reference surface for height measurement. A height of the reference surface may be determined to be "0".

As such, when there is no change in the wavefront of the reflected light L2 reflected from the reflective surface S1 of the reference object 51, a coefficient value of a defocus term in Zernike polynomials stored in the calculation unit 150 may be "0".

Next, the coefficient value of the defocus term according to an upward and downward movement of the reference point P is measured. The upward and downward movement of the reference point P may be performed by moving the reflective surface S1 of the reference object 51 upward and downward relative to the reference surface as shown in FIGS. 2B and 2C. The upward and downward movement of the reference point P may be performed by moving upward and downward at least one from among the stage 50 and the measuring device 100.

The wavefront of the reflected light L2 of the reference object 51 may be changed according to the upward and downward movement of the reference point P, the change in the wavefront of the reflective surface S1 may be detected by the light sensing unit 140, and then the coefficient value of the defocus term of the Zernike polynomials stored in the calculation unit 150 may be measured by using the change in the wavefront.

In detail, when the reflective surface S1 of the reference object 51 moves upward to be higher than the reference surface as shown in FIG. 2B, a height of the reference point P has a "positive (+)" value, and in this case, the wavefront W of the reflected light L2 reflected from the reflective surface S1 of the reference object 51 may be changed into a convex shape and may be detected by the light sensing unit 140. As such, when the wavefront W of the reflected light L2 detected by the light sensing unit 140 is changed into the convex shape, a coefficient of the defocus term in the Zernike polynomials that represents the change in the wavefront of the reflected light L2 stored in the calculation unit 150 as a formula may have a "positive (+)" value.

Next, when the reflective surface S1 of the reference object 51 moves downward to be lower than the reference surface as shown in FIG. 2C, the height of the reference point P may have a "negative (−)" value, and in this case, the wavefront W of the reflected light L2 reflected from the reflective surface S1 of the reference object 51 may be changed into a concave shape and may be detected by the light sensing unit 140. As such, when the wavefront W of the reflected light L2 detected by the light sensing unit 140 is changed into the concave shape, the coefficient of the defocus term in the Zernike polynomials stored in the calculation unit 150 may have a "negative (−)" value.

A case where the reflective surface S1 when there is no change in the wavefront of the reflected light L2, that is, when the coefficient value of the defocus term is "0", is set as the reference surface for height measurement has been described. However, the present embodiment is not limited thereto, and the reflective surface S1 when there is the change in the wavefront of the reflected light L2, that is, when the coefficient value of the defocus term has a "positive (+)" or "negative (−)" value, may be set as the reference surface for height measurement.

As described above, a change in the coefficient value of the defocus term according to the vertical movement of the reference point P is calculated and calculated calibration data is stored in the calculation unit 150. The reference object 51 may be unloaded from the stage 50.

Referring to FIG. 5B, the target object 55 to be measured is loaded on the stage 50. The measuring device 100 is moved to a position of the reference point P, and then the probe light L1 is emitted from the light source 110 to the target object 55. The probe light L1 emitted from the light source 110 may be transmitted through the beam splitter 120, and then may be focused by the light focusing unit 130 and may be emitted to the target object 55.

The light sensing unit 140 detects a change in a wavefront of the reflected light L2 reflected from a reflective surface S2 of the target object 55. In detail, the probe light L1 passing through the light focusing unit 130 is reflected by the reflective surface S2 of the target object 55, and the reflected light L2 is incident on the light sensing unit 140. The reflected light L2 reflected by the reflective surface S2 of the target object 55 may pass through the light focusing unit 130, may be reflected by the beam splitter 120, and then may be incident on the light sensing unit 140. The light sensing unit 140 including the Shack-Hartmann sensor may detect the change in the wavefront of the reflected light L2.

A change in a height of the reflective surface S2 of the target object 55 is measured by using the change in the reflected light L2 detected by the light sensing unit 140. In detail, the change in the wavefront of the reflected light L2 detected by the light sensing unit 140 is input to the calculation unit 150, and the calculation unit 150 calculates a coefficient value of a defocus term of Zernike polynomials by using the change in the wavefront of the reflected light L2. A height change Δh of the reflective surface S2 of the target object 55 may be measured by comparing the calculated coefficient value of the defocus term with calibration data stored in the calculation unit 150. A thickness t2 of the target object 55 may be measured by adding the thickness t1 of the target object 51 to the measured height change Δh of the reflective surface S2 of the target object 55.

Figure 6A:
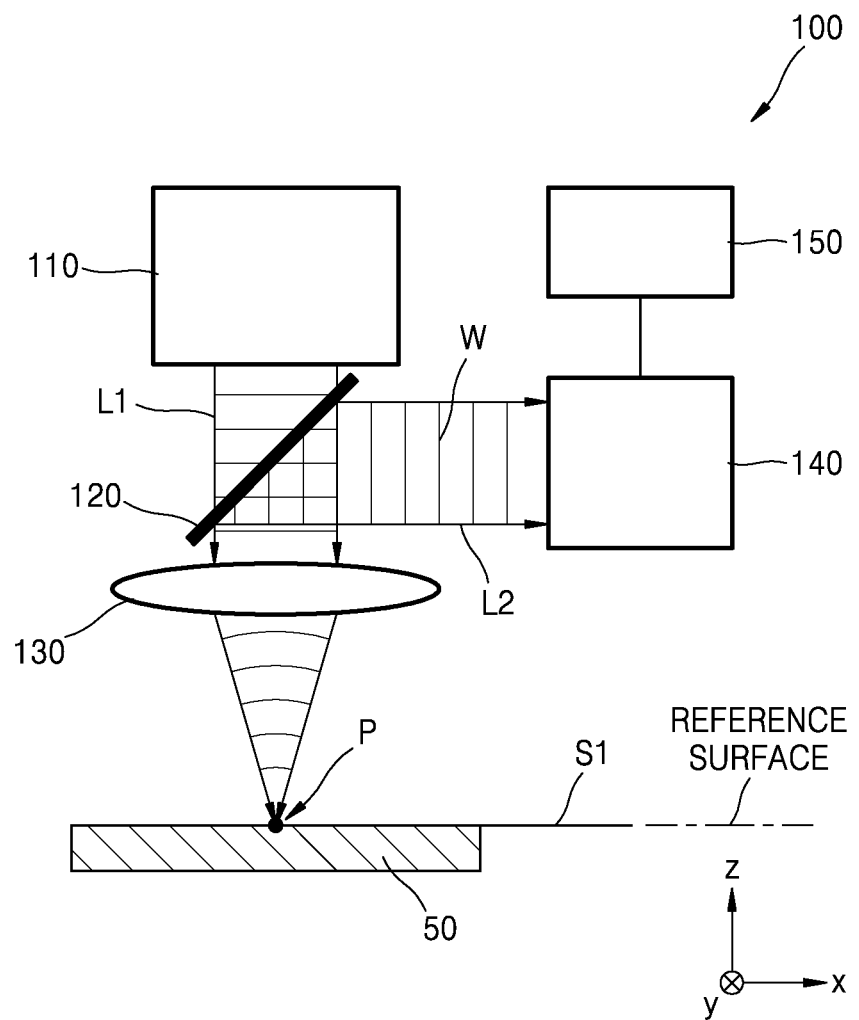
FIGS. 6A and 6B are views for explaining the another example of the measuring method of FIG. 4.
Figure 6B:
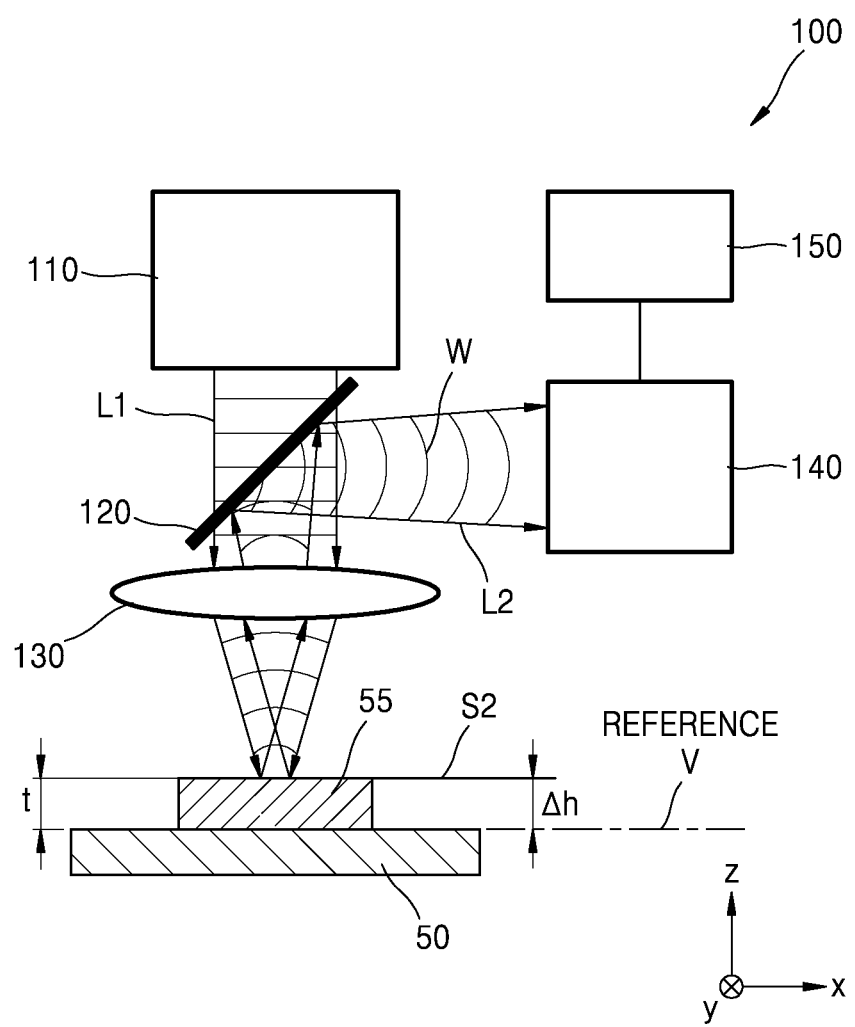

FIGS. 6A and 6B are views for explaining the another example of the measuring method of FIG. 4. Referring to FIG. 6A, the reference point P of the measuring device 100 may be set on the reflective surface S1 of the stage 50. Next, the probe light L1 emitted from the light source 110 and transmitted through the beam splitter 120 is focused by the light focusing unit 130, and then is incident on the reflective surface S1 of the stage 50. Next, the probe light L1 may be reflected by the reflective surface S1, and the reflected light L2 may be reflected by the beam splitter 120 and then may be incident on the light sensing unit 140.

The light sensing unit 140 including a Shack-Hartmann sensor may detect a change in a wavefront of the reflected light L2 reflected from the reflective surface S1 of the stage 50. In FIG. 6A, as shown in FIG. 2A, the wavefront W of the reflected light L2 reflected from the reflective surface S1 of the stage 50 and incident on the light sensing unit 140 is a plane wavefront, and thus there is no change in the wavefront of the reflected light L2. As such, the reflective surface S1 of the stage 50 with no change in the wavefront of the reflected light L2 may correspond to a reference surface for height measurement. A height of the reference surface may be determined to be "0". As such, when there is no change in the wavefront of the reflected light L2 reflected from the reflective surface S1 of the stage 50, a coefficient value of a defocus term in Zernike polynomials stored in the calculation unit 150 may be "0".

Next, the coefficient value of the defocus term according to an upward and downward movement of the reference point P is measured. The upward and downward movement of the reference point P may be performed by moving the reflective surface S1 of the stage 50 upward and downward relative to the reference surface as shown in FIGS. 2B and 2C. The upward and downward movement of the reference point P may be performed by moving upward and downward at least one from among the stage 50 and the measuring device 100.

The wavefront of the reflected light L2 reflected from the reflective surface S1 may be changed according to the upward and downward movement of the reference point P, the change in the wavefront of the reflected light L2 may be detected by using the light sensing unit 140, and then the coefficient value of the defocus term of the Zernike polynomials stored in the calculation unit 150 may be measured by using the change in the wavefront of the reflected light L2. The measuring of the coefficient value of the defocus term according to the upward and downward movement of the preference point P has been described above in detail, and thus an explanation thereof will not be given. As such, a change in the coefficient value of the defocus term according to the upward and downward movement of the reference point P is calculated and calibration data is stored in the calculation unit 150.

A case where the reflective surface S1 when there is no change in the wavefront of the reflected light L2, that is, when the coefficient value of the defocus term is "0", is set as the reference surface for height measurement has been described. However, the present embodiment is not limited thereto, and the reflective surface S1 when there is the change in the wavefront of the reflected light L2, that is, when the coefficient value of the defocus term has a "positive (+)" or "negative (−)" value, may be set as the reference surface for height measurement.

Referring to FIG. 6B, the target object 55 to be measured is loaded on the stage 50. The measuring device 100 is moved to a position of the reference point P, and then the probe light L1 is emitted from the light source 110 to the target object 55. The probe light L1 emitted from the light source 110 may be transmitted through the beam splitter 120, and then may be focused by the light focusing unit 130 and may be emitted to the target object 55.

The light sensing unit 140 detects a change in a wavefront of the reflected light L2 reflected from the reflective surface S2 of the target object 55. In detail, the probe light L1 passing through the light focusing unit 130 is reflected by the reflective surface S2 of the target object 55, and the reflected light L2 is incident on the light sensing unit 140. The reflected light L2 reflected by the reflective surface S2 of the target object 55 may pass through the light focusing unit 130, may be reflected by the beam splitter 120, and then may be incident on the light sensing unit 140. The light sensing unit 140 including the Shack-Hartmann sensor may detect the change in the wavefront of the reflected light L2.

A change in a height of the reflective surface S2 of the target object 55 is measured by using the change in the reflected light L2 detected by the light sensing unit 140. In detail, the change in the wavefront of the reflected light L2 detected by the light sensing unit 140 is input to the calculation unit 150, and the calculation unit 150 calculates a coefficient value of a defocus term of Zernike polynomials by using the change in the wavefront of the reflected light L2. The height change Δh of the reflective surface S2 of the target object 55 may be measured by comparing the calculated coefficient value of the defocus term with calibration data stored in the calculation unit 150. The height change Δh of the reflective surface S2 of the target object 55 may correspond to a thickness t of the target object 55.

According to the measuring device 100, the light focusing unit 130 may focus the probe light L1 and may emit the focused probe light L1 to the target object 55, the light sensing unit 140 including the Shack-Hartmann sensor may detect a change in a wavefront of the reflected light L2 reflected from the target object 55, and the calculation unit 150 may measure a change in a height of a reflective surface of the target object 55 by calculating a coefficient value of a defocus term by using the change in the wavefront of the reflected light detected by the light sensing unit 140. Accordingly, a change in a thickness or a height of the target object 55 such as a wafer or a flat object may be effectively and accurately measured. Also, a shape of the target object 55 according to a scan line or a scan area may also be measured by scanning the probe light L1 emitted from the light source 110 to the target object 55. Since a change in a thickness or a height measured by the light sensing unit 140 including the Shack-Hartmann sensor is not related to a degree of tilting of the light sensing unit 140, the light sensing unit 140 may be easily optically aligned when the measuring device 100 is set up.

A laser processing device and a laser processing method that may perform a laser processing operation by automatically adjusting a focus by using the measuring device will now be described.

Figure 7A:
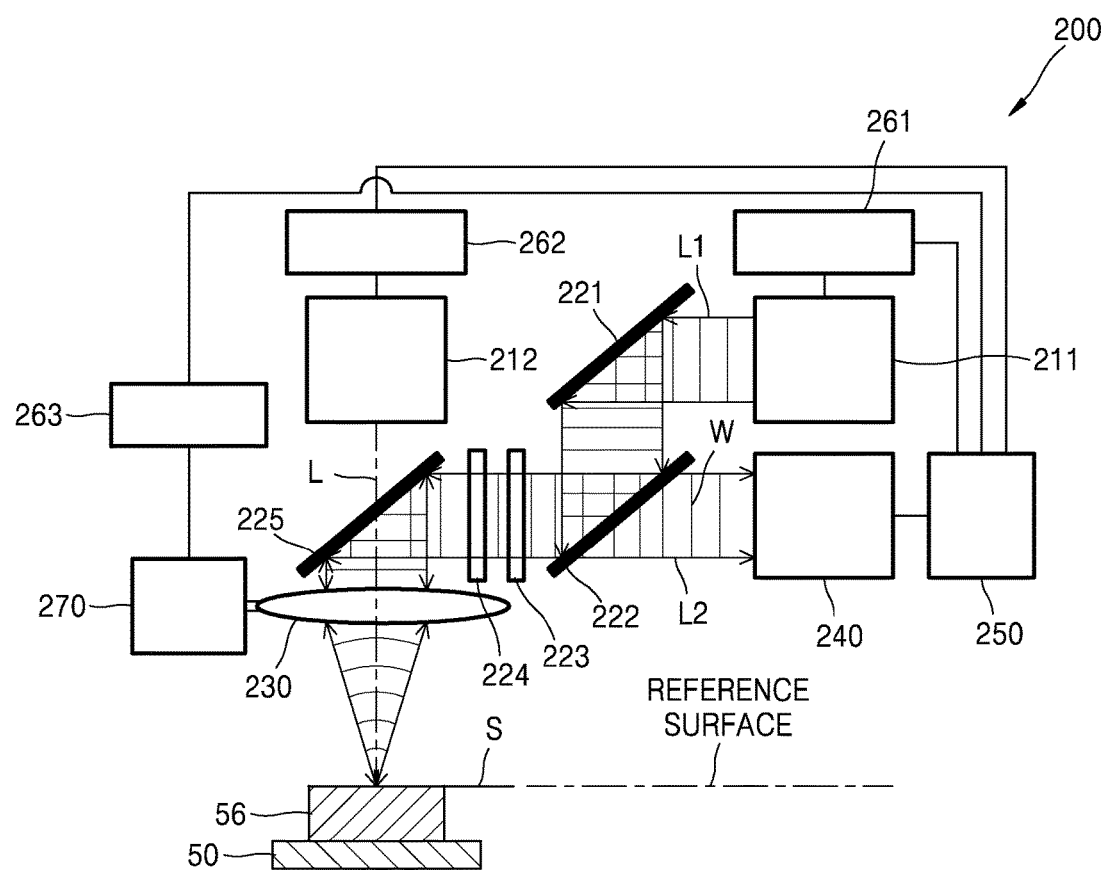
FIGS. 7A through 7C are views illustrating a laser processing device and a laser processing method according to an example embodiment of the present invention.
Figure 7B:
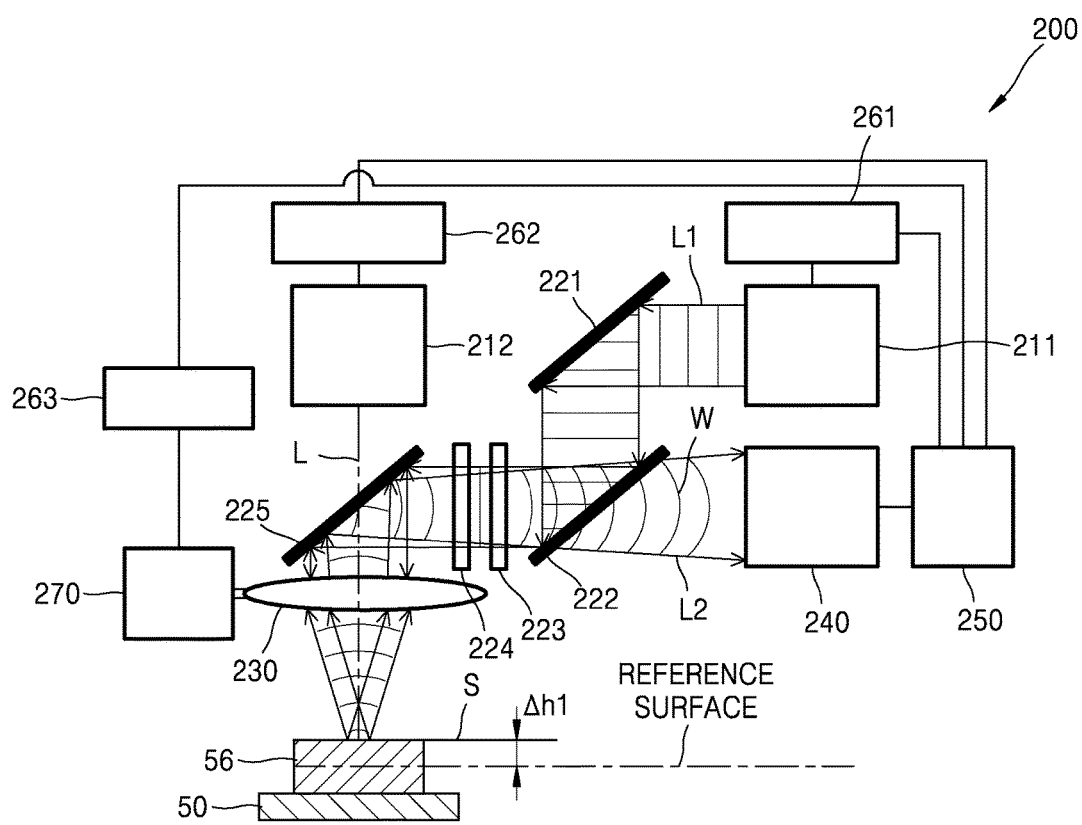
Figure 7C:
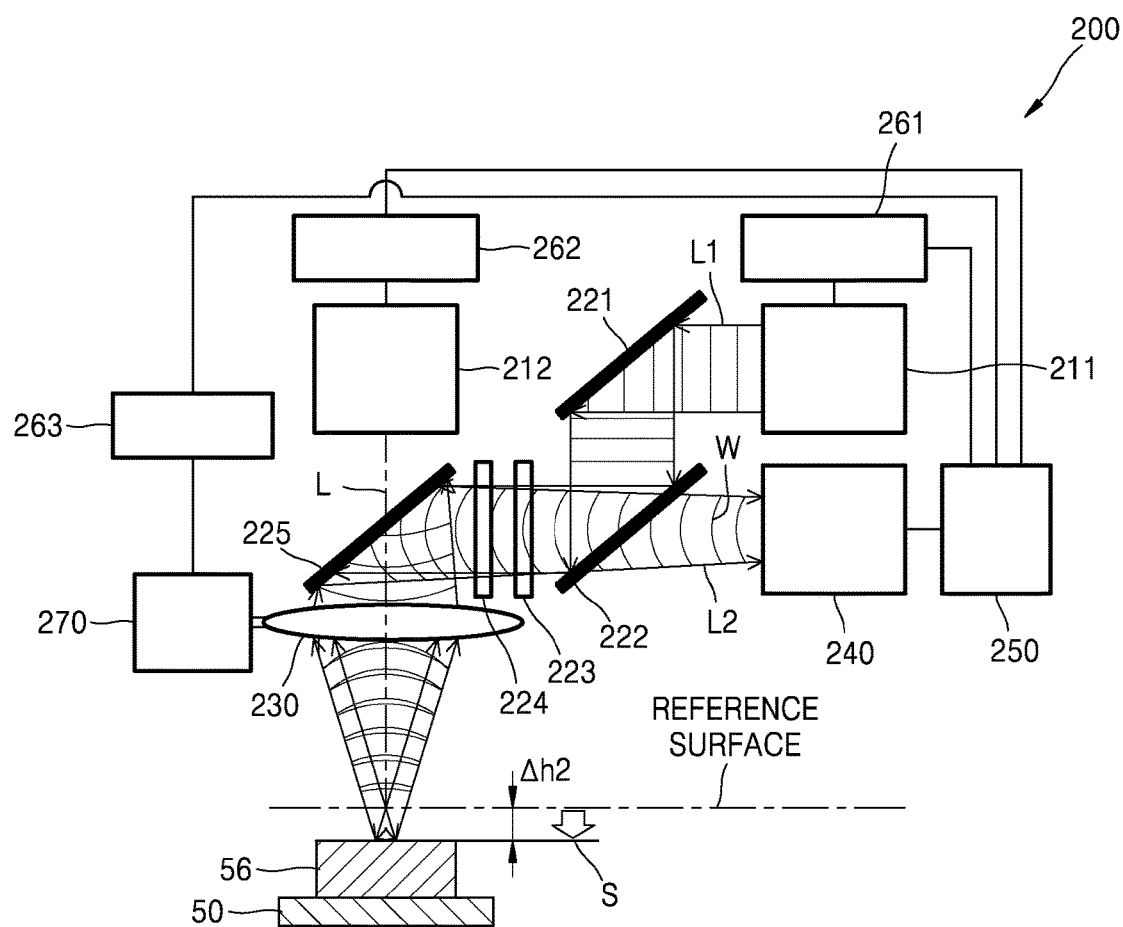

FIGS. 7A through 7C are views illustrating a laser processing device 200 and a laser processing method according to an example embodiment of the present invention.

Referring to FIGS. 7A through 7C, the laser processing device 200 includes a measuring device including a first light source 211, a light focusing unit 230, a light sensing unit 240, and a calculation unit 250, a second light source 212 configured to emit laser light L to an object 56 to be processed, and a focus adjusting device.

The measuring device may measure a change in a height of the object 56 loaded on the stage 50 in real time. The first light source 211 emits the probe light L1 for measurement. The light focusing unit 230 focuses the probe light L1 and emits the focused probe light L1 to the object 56, and the light sensing unit 240 detects a change in the reflected light L2 that is the probe light L1 reflected from a reflective surface S of the object 56. The light sensing unit 240 includes a Shack-Hartmann sensor for detecting a change in a wavefront of the reflected light L2. The calculation unit 250 may measure the change in the height of the object 56 by using the change in the reflected light L2 detected by the light sensing unit 240. The calculation unit 250 may measure the change in the height of the object 56 by representing the change in the wavefront of the reflected light L2 by using Zernike polynomials that is a mathematical model. The Zernike polynomials may include a plurality of terms, and a coefficient value of a defocus term from among the plurality of terms may be used to determine the change in the height of the object 56.

The measuring device has already been described above in detail, and thus an explanation thereof will not be given. A change in the coefficient value of the defocus term according to the change in the height of the object 56 is previously stored as calibration data in the calculation unit 250.

The second light source 212 may emit the laser light L for processing the object 56. The laser light L emitted from the second light source 212 may be focused by the light focusing unit 230 and may be emitted to the object 56. Accordingly, the probe light L1 emitted from the first light source 211 and the laser light L emitted from the second light source 212 may be emitted through one light focusing unit 230 to the object 56.

A dichroic mirror 225 may be provided between the first and second light sources 211 and 212 and the light focusing unit 230. The dichroic mirror 225 may transmit any one from among the probe light L1 emitted from the first light source 211 and the laser light L emitted from the second light source 212 and may reflect the remaining light. The dichroic mirror 225 transmits the laser light L and reflects the probe light L1 in FIG. 7A. However, the present embodiment is not limited thereto, and the dichroic mirror 225 may be configured to reflect the laser light L and transmit the probe light L1.

A beam splitter 222 may be provided between the first light source 211 and the dichroic mirror 225. The beam splitter 222 may transmit any one from among the probe light L1 emitted from the first light source 211 and the reflected light L2 reflected from the reflective surface S of the object 56 and may reflect the remaining light. The beam splitter 222 reflects the probe light L1 and transmits the reflected light L2 in FIG. 7A. However, the present embodiment is not limited thereto, and the beam splitter 222 may be configured to transmit the probe light L1 and reflect the reflected light L2. A reflective mirror 221 may be provided between the first light source 211 and the beam splitter 222 to guide the probe light L1 emitted from the first light source 211 toward the beam splitter 222.

A wave plate 223 and a bandpass filter 224 may be further provided between the dichroic mirror 225 and the beam splitter 222. The wave plate 223 may adjust an intensity of the probe light L1 and may emit the adjusted probe light L1. The bandpass filter 224 may pass only light corresponding to a specific wavelength bandwidth from among pieces of reflected light L2 reflected by the reflective surface S of the object 56.

A first controller 261 for controlling the first light source 211 that emits the probe light L1 may be provided between the calculation unit 250 and the first light source 211, and a second controller 262 for controlling the second light source 212 that emits the laser light L may be provided between the calculation unit 250 and the second light source 212.

The focus adjusting device may automatically adjust a focus of the laser light L emitted to the object 56 during a laser processing operation. To this end, the focus adjusting device may include a driver 270 that may vertically move the light focusing unit 230 relative to the object 56 and a third controller that may control the driver 270. The third controller 263 may be connected to the calculation unit 250 and may control the driver 270 to vertically move the light focusing unit 230 in response to the change in the height of the object 56 calculated by the calculation unit 250.

In the laser processing device 200 having the above structure, the probe light L1 is emitted from the first light source 211 through the light focusing unit 230 to the object 56, and the laser light L is emitted from the second light source 212 through the light focusing unit 230 to the object 56.

The probe light L1 emitted from the first light source 211 is reflected by the beam splitter 222, is reflected by the dichroic mirror 225, and then is emitted through the light focusing unit 230 to the object 56. Next, the probe light L1 is reflected from the reflective surface S of the object 56, and the reflected light L2 is reflected by the dichroic mirror 225, is transmitted through the beam splitter 222, and then is incident on the light sensing unit 240. The light sensing unit 240 including the Shack-Hartmann sensor detects the change in the wavefront of the reflected light L2, and the calculation unit 250 measures the change in the height of the object 56 by using the detected change in the wavefront. The laser light L emitted from the second light source 212 is transmitted through the dichroic mirror 225, passes through the light focusing unit 230, and is emitted to the object 56, thereby performing the processing operation. When the height of the object is changed during the laser processing operation, the calculation unit 250 of the measuring device may measure the change in the height, and the driver 270 of the focus adjusting device may perform the laser processing operation by automatically adjusting the focus of the laser light L emitted to the object 56 by vertically moving the light focusing unit 230.

A laser processing method according to an embodiment of the present invention will now be described with reference to FIGS. 7A through 7C.

In FIG. 7A, the laser light L is accurately focused on the object 56, and a precise laser processing operation may be performed in this state. Referring to FIG. 7A, the laser light L emitted from the second light source 212 may be focused by the light focusing unit 230 and may be emitted to the object 56, and in this case, a focusing point for performing a laser processing operation may be formed on the object 56. In this case, it may be measured that there is no change in a height of the object 56 measured by the measuring device. In detail, the probe light L1 emitted from the first light source 211 passes through the light focusing unit 230 and is incident on the object 56. Next, the probe light L1 may be reflected by the reflective surface S of the object 56, and the reflected light L2 may be incident on the light sensing unit 240.

The light sensing unit 240 including the Shack-Hartmann sensor may detect a change in a wavefront of the reflected light L2 reflected from the reflective surface S of the target object 56. Since the wavefront W of the reflected light L2 reflected from the reflective surface S of the object is a plane wavefront, like that of the probe light L1, there is no change in the wavefront of the reflected light L2. Accordingly, a coefficient value of a defocus term calculated by the calculation unit 250 may be "0". As such, the reflective surface S of the object 56 with no change in the wavefront of the reflected light L2 may be set as a reference surface for height measurement.

In FIG. 7B, a height of the object 56 is greater than that in FIG. 7A. That is, in FIG. 7B, the reflective surface S of the object 56 is at a position higher than that of the reference surface. During a laser processing operation, a thickness of the object 56 may be increased or the height of the object 56 may be increased to be greater than that of the reference surface of FIG. 7A due to an external environment.

When the height of the object 56 is increased, the wavefront W of the reflected light L2 reflected from the reflective surface S of the object 56 may be changed into a convex shape and may be incident on the light sensing unit 240. As such, when the wavefront W of the reflected light L2 detected by the light sensing unit 240 is changed into the convex shape, a coefficient of a defocus term in Zernike polynomials stored in the calculation unit 250 may have a "positive (+)" value. A height change Δh1 of the object 56 may be measured by comparing the calculated coefficient value of the defocus term with calibration data previously stored in the calculation unit 250.

The calculation unit 250 may transmit the measured height change Δh1 of the object 56 to the third controller 263 of the focus adjusting device, and the third controller 263 may raise the light focusing unit 230 by driving the driver 270. In detail, the driver 270 may raise the light focusing unit 230 by a distance corresponding to the height change Δh1 of the object 56. As such, since the driver 270 raises the light focusing unit 230 by a distance corresponding to the height change Δh1 of the object 56, the laser light L may be accurately focused on the object 56 as shown in FIG. 7A and a laser processing operation may be precisely performed in this state.

In FIG. 7C, a height of the object 56 is less than that in FIG. 7A. That is, in FIG. 7C, the reflective surface S of the object 56 is at a position lower than that of the reference surface. During a laser processing operation, a thickness of the object 56 may be reduced or the height of the object 56 may be reduced to be less than that of the reference surface of FIG. 7A due to an external environment.

When the height of the object 56 is reduced, the wavefront W of the reflected light L2 reflected from the reflective surface S of the object 56 may be changed into a concave shape and may be incident on the light sensing unit 240. As such, when the wavefront W of the reflected light L2 detected by the light sensing unit 240 is changed into the concave shape, a coefficient of a defocus term in Zernike polynomials stored in the calculation unit 250 may have a "negative (−)" value. A height change Δh2 of the object 56 may be measured by comparing the calculated coefficient value of the defocus term with calibration data previously stored in the calculation unit 250.

The calculation unit 250 may transmit the measured height change Δh2 of the object 56 to the third controller 263 of the focus adjusting device, and the third controller 263 may lower the light focusing unit 230 by driving the driver 270. In detail, the driver 270 may lower the light focusing unit 230 by a distance corresponding to the height change Δh2 of the object 56. As such, since the driver 270 lowers the light focusing unit 230 by a distance corresponding to the height change Δh2 of the object 56, the laser light L may be accurately focused on the object 56 as shown in FIG. 7A and a laser processing operation may be precisely performed in this state.

A case where the reflective surface S of the object 56 when there is no change in the wavefront of the reflected light L2, that is, when the coefficient value of the defocus term is "0", is set as the reference surface for height measurement has been described. However, the present embodiment is not limited thereto, and the reflective surface S of the object 56 when there is the change in the wavefront of the reflected light L2, that is, when the coefficient value of the defocus term has a "positive (+)" or "negative (−)" value, may be set as the reference surface.

As described above, in the laser processing device 200 according to the present embodiment, when a height of the object 56 is changed during a laser processing operation, the measuring device may measure the change in the height of the object 56 in real time and the focus adjusting device may adjust a position of the light focusing unit 230 by using the measured change in the height of the object 56, thereby making it possible to accurately perform the laser processing operation in real time.

Figure 8:
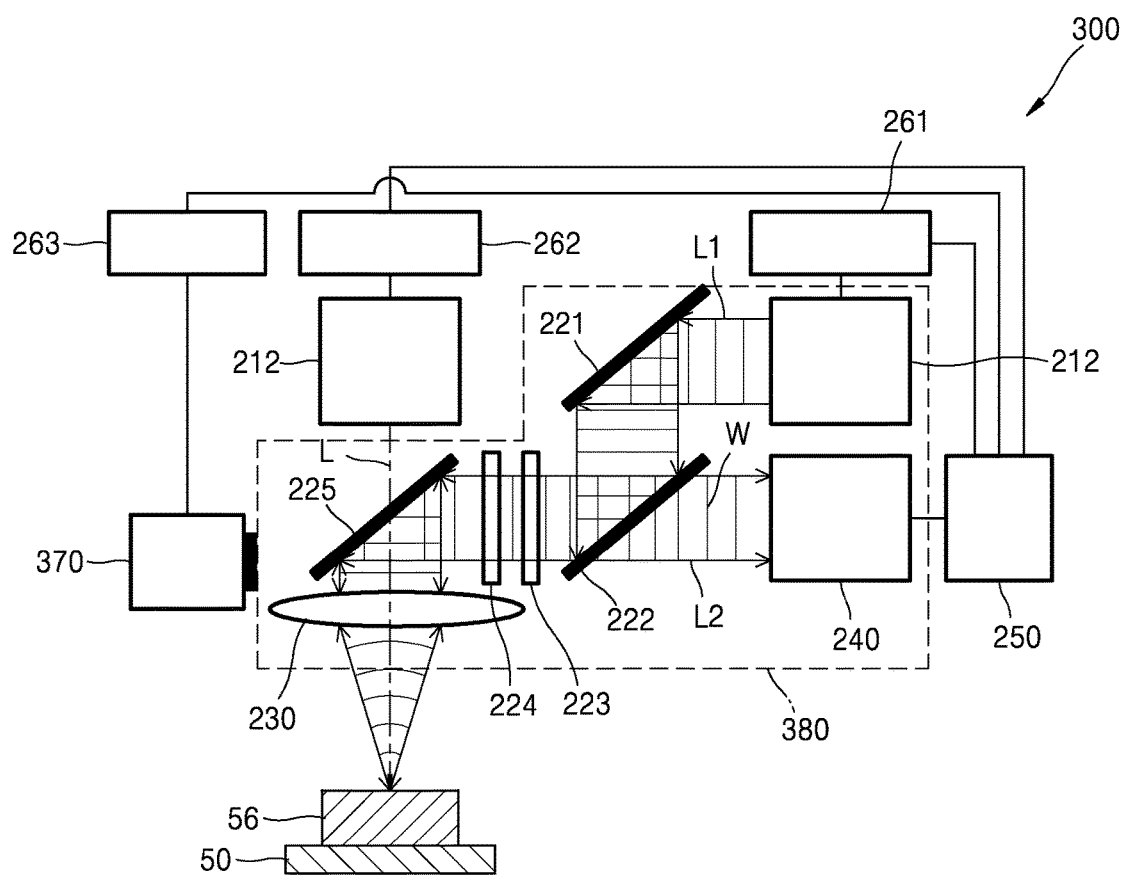
FIG. 8 is a view illustrating a laser processing device according to another example embodiment of the present invention.

FIG. 8 is a view illustrating a laser processing device 300 according to another example embodiment of the present invention. The laser processing device 300 of FIG. 8 is the same as the laser processing device 200 of FIGS. 7A through 7C except that a driver 370 moves a measuring device 380. Referring to FIG. 8, the driver 370 of the focus adjusting device vertically moves the measuring device 380 relative to the object 56 in order to adjust a focus of the laser light L. Although the calculation unit 250 is not included in the measuring device 380 moved by the driver 370 in FIG. 8, the calculation unit 250 may be included in the measuring device 380.

The driver 270 or 370 moves the light focusing unit 230 or the measuring device 380 upward and downward relative to the object 56 in the above embodiments. However, the present invention is not limited thereto, and the driver 270 or 370 may adjust the focus of the laser light L by moving upward and downward the stage 50.

Figure 9A:
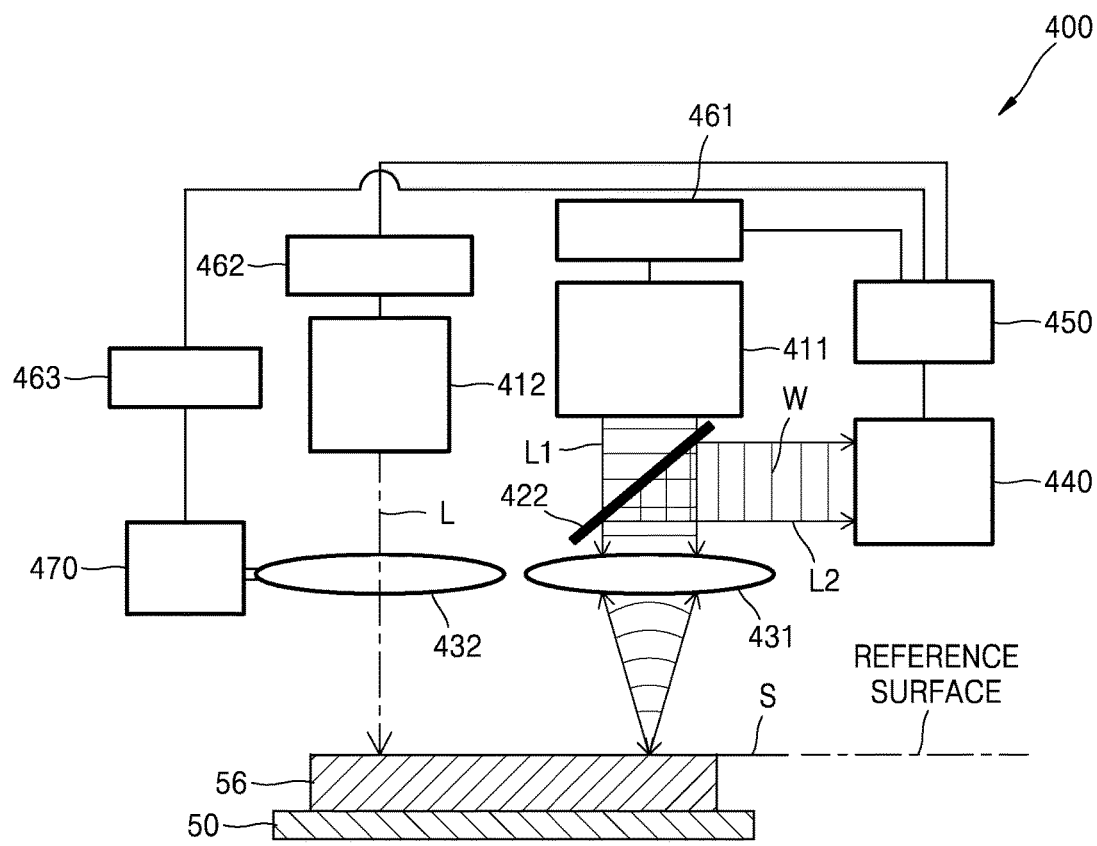
FIGS. 9A through 9C are views for explaining a laser processing device and a laser processing method according to another example embodiment of the present invention.
Figure 9B:
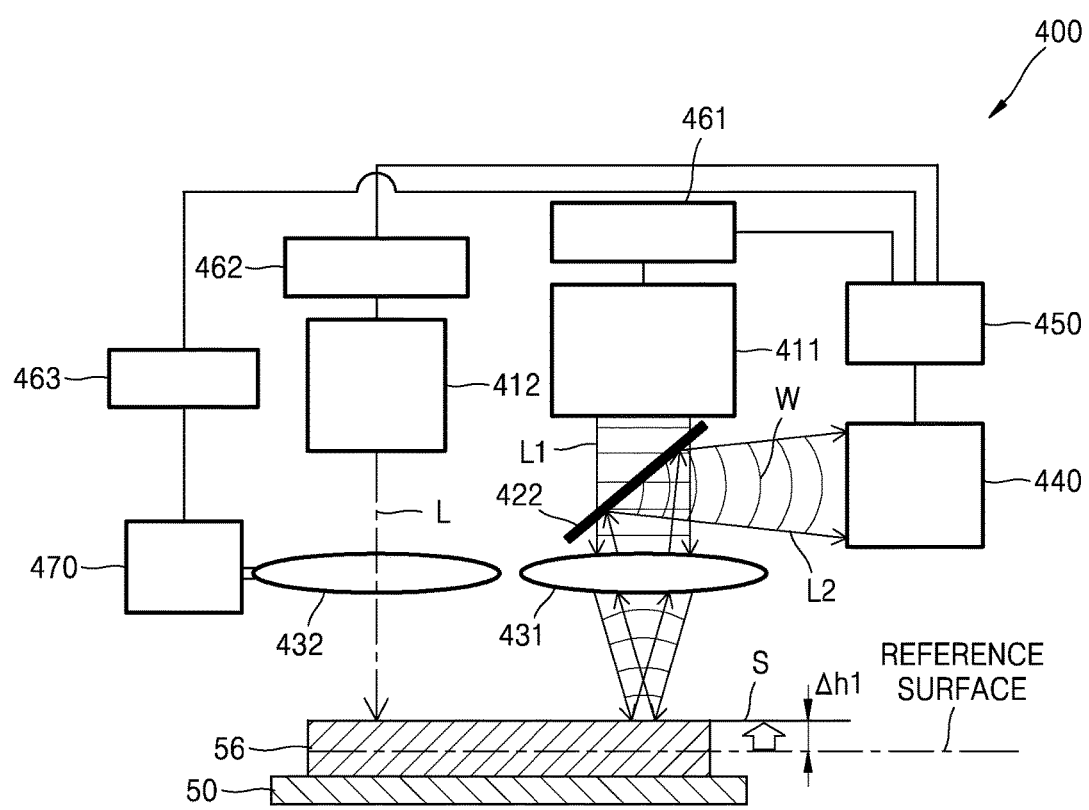
Figure 9C:
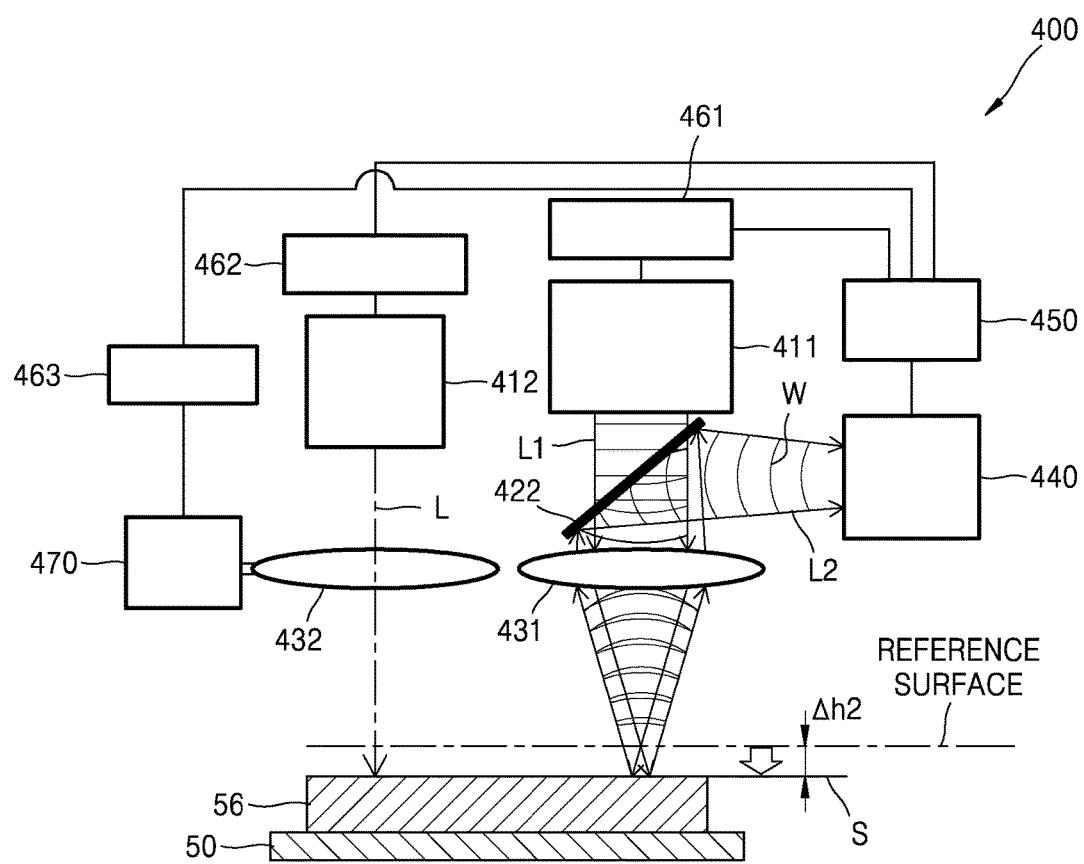

FIGS. 9A through 9C are views for explaining a laser processing device 400 and a laser processing method according to another example embodiment of the present invention.

Referring to FIGS. 9A through 9C, the laser processing device 400 includes a measuring device configured to measure a change in a height of the object 56 in real time, a processing device configured to perform a processing operation on the object 56, and a focus adjusting device.

The measuring device includes a first light source 411 configured to emit the probe light L1, a first light focusing unit 431 configured to focus the probe light L1 and emit the focused probe light L1 to the object 56, a light sensing unit 440 configured to detect a change in the reflected light L2 reflected from the object and including a Shack-Hartmann sensor, and a calculation unit 450 configured to measure the change in the height of the object 56 by using the change in the reflected light L2 detected by the light sensing unit 440. The measuring device has been described in the above embodiments, and thus a detailed explanation thereof will not be given. A change in a coefficient value of a defocus term according to the change in the height of the object 56 is previously stored as calibration data in the calculation unit 450.

A beam splitter 422 may be provided between the first light source 411 and the first light focusing unit 431. The beam splitter 422 may transmit any one from among the probe light L1 emitted from the first light source 411 and the reflected light L2 that is the probe light L1 reflected from the reflective surface S of the object 56 and may reflect the remaining light. Although the beam splitter 422 transmits the probe light L1 and reflects the reflected light L2 in FIG. 9A, the beam splitter 422 may be configured to reflect the probe light L1 and transmit the reflected light L2.

The processing device includes a second light source 412 configured to emit the laser light L for processing the object 56 and a second light focusing unit 432 configured to focus the laser light L emitted from the second light source 412 and emit the focused laser light L to the object 56. A first controller 461 for controlling the first light source 411 that emits the probe light L1 may be provided between the calculation unit 450 and the first light source 411, and a second controller 462 for controlling the second light source 412 that emits the laser light L may be provided between the calculation unit 450 and the second light source 412.

The focus adjusting device may automatically adjust a focus of the laser light L emitted to the object 56 during a laser processing operation. To this end, the focus adjusting device may include a driver 470 that may vertically move the second light focusing unit 432 relative to the object 56 and a third controller 463 that may control the driver 470. The third controller 463 may be connected to the calculation unit 450 and may control the driver 470 to vertically move the third light focusing unit 432 in response to the change in the height of the object 56 calculated by the calculation unit 450. Although not shown in FIGS. 9A through 9C, the driver 470 may be configured to drive the second light focusing unit 432 and the first light focusing unit 431.

In the laser processing device 400 having the above structure, the probe light L1 is emitted from the first light source 411 through the first light focusing unit 431 to the object 56, and the laser light L is emitted from the second light source 412 through the second light focusing unit 432 to the object 56.

The probe light L1 emitted from the first light source 411 is transmitted through the beam splitter 422, and then is emitted through the first light focusing unit 431 to the object 56. Next, the probe light L1 is reflected from the reflective surface S of the object 56, and the reflected light L2 is reflected by the beam splitter 422 and then is incident on the light sensing unit 440. The light sensing unit 440 including the Shack-Hartmann sensor detects a change in a wavefront of the reflected light L2, and the calculation unit 450 measures the change in the height of the object 56 by using the detected change in the wavefront. The laser light L emitted from the second light source 412 is focused by the second light focusing unit 432 and is emitted to the object 56, thereby performing the processing operation. When the height of the object 56 is changed during the laser processing operation, the measuring device may measure the change in the height, and the focus adjusting device may automatically adjust the focus of the laser light L emitted to the object 56 in real time by vertically moving the second light focusing unit 432 in response to the change in the height, thereby performing the laser processing operation.

A laser processing method according to an embodiment of the present invention will now be described with reference to FIGS. 9A through 9C.

In FIG. 9A, the laser light L is focused on the object 56, and a precise laser processing operation may be performed in this state. Referring to FIG. 9A, the laser light L emitted from the second light source 412 may be focused by the second light focusing unit 432 and may be emitted to the object 56, and in this case, a focusing point for performing a laser processing operation may be formed on the object 56. In this case, it may be measured that there is no change in a height of the object 56 measured by the measuring device. In detail, the probe light L1 emitted from the first light source 411 passes through the first light focusing unit 431 and is incident on the object 56. Next, the probe light L1 may be reflected by the reflective surface S of the object 56, and the reflected light L2 may be incident on the light sensing unit 440.

The light sensing unit 440 including the Shack-Hartmann sensor may detect a change in a wavefront of the reflected light L2 reflected from the reflective surface S of the object 56. Since the wavefront W of the reflected light L2 reflected from the reflective surface S of the object 56 is a plane wavefront in FIG. 9A, like that of the probe light L1, there is no change in the wavefront of the reflected light L2. Accordingly, a coefficient value of a defocus term calculated by the calculation unit 450 may be "0". As such, the reflective surface S of the object 56 with no change in the wavefront of the reflected light L2 may be set as a reference surface for height measurement.

In FIG. 9B, a height of the object 56 is greater than that in FIG. 9A. That is, in FIG. 9B, the reflective surface S of the object 56 is at a position higher than that of the reference surface.

When the height of the object 56 is increased, the wavefront W of the reflected light L2 reflected from the reflective surface S of the object 56 may be changed into a convex shape and may be incident on the light sensing unit 440. As such, when the wavefront W of the reflected light L2 detected by the light sensing unit 440 is changed into the convex shape, a coefficient of a defocus term in Zernike polynomials stored in the calculation unit 450 may have a "positive (+)" value. The height change Δh1 of the object 56 may be measured by comparing the calculated coefficient value of the defocus term with calibration data previously stored in the calculation unit 450.

The calculation unit 450 may transmit the measured height change Δh1 of the object 56 to the third controller 463 of the focus adjusting device, and the third controller 463 may raise the second light focusing unit 432 by driving the driver 470. In detail, the driver 470 may raise the second light focusing unit 432 by a distance corresponding to the height change Δh1 of the object 56. As such, since the driver 470 raises the second light focusing unit 432 by a distance corresponding to the height change Δh1 of the object 56, the laser light L may be accurately focused on the object 56 as shown in FIG. 9A and a laser processing operation may be precisely performed in this state.

In FIG. 9C, a height of the object 56 is less than that in FIG. 9A. That is, in FIG. 9C, the reflective surface S of the object 56 is at a position lower than that of the reference surface.

When the height of the object 56 is reduced, the wavefront W of the reflected light L2 reflected from the reflective surface S of the object 56 may be changed into a concave shape and may be incident on the light sensing unit 440. As such, when the wavefront W of the reflected light L2 detected by the light sensing unit 440 is changed into the concave shape, a coefficient of a defocus term in Zernike polynomials stored in the calculation unit 450 may have a "negative (−)" value. The height change Δh2 of the object 56 may be measured by comparing the calculated coefficient value of the defocus term with calibration data previously stored in the calculation unit 450.

The calculation unit 450 may transmit the measured height change Δh2 of the object 56 to the third controller 463 of the focus adjusting device, and the third controller 463 may lower the second light focusing unit 432 by driving the driver 470. In detail, the driver 470 may lower the second light focusing unit 432 by a distance corresponding to the height change Δh2 of the object 56. As such, since the driver 470 lowers the second light focusing unit 432 by a distance corresponding to the height change Δh2 of the object 56, the laser light L may be accurately focused on the object 56 as shown in FIG. 9A and a laser processing operation may be precisely performed in this state.

A case where the reflective surface S of the object 56 when there is no change in the wavefront of the reflected light L2, that is, when the coefficient value of the defocus term is "0", is set as the reference surface for height measurement has been described. However, the present embodiment is not limited thereto, and the reflective surface S of the object 56 when there is the change in the wavefront of the reflected light L2, that is, when the coefficient value of the defocus term has a "positive (+)" or "negative (−)" value, may be set as the reference surface.

As described above, in the laser processing device 400 according to the present embodiment, when a height of the object 56 is changed during a laser processing operation, the measuring device may measure the change in the height of the object 56 in real time and the focus adjusting device may adjusts a position of the second light focusing unit 432 by using the measured change in the height of the object 56, thereby making it possible to accurately perform the laser processing operation in real time.

Figure 10:
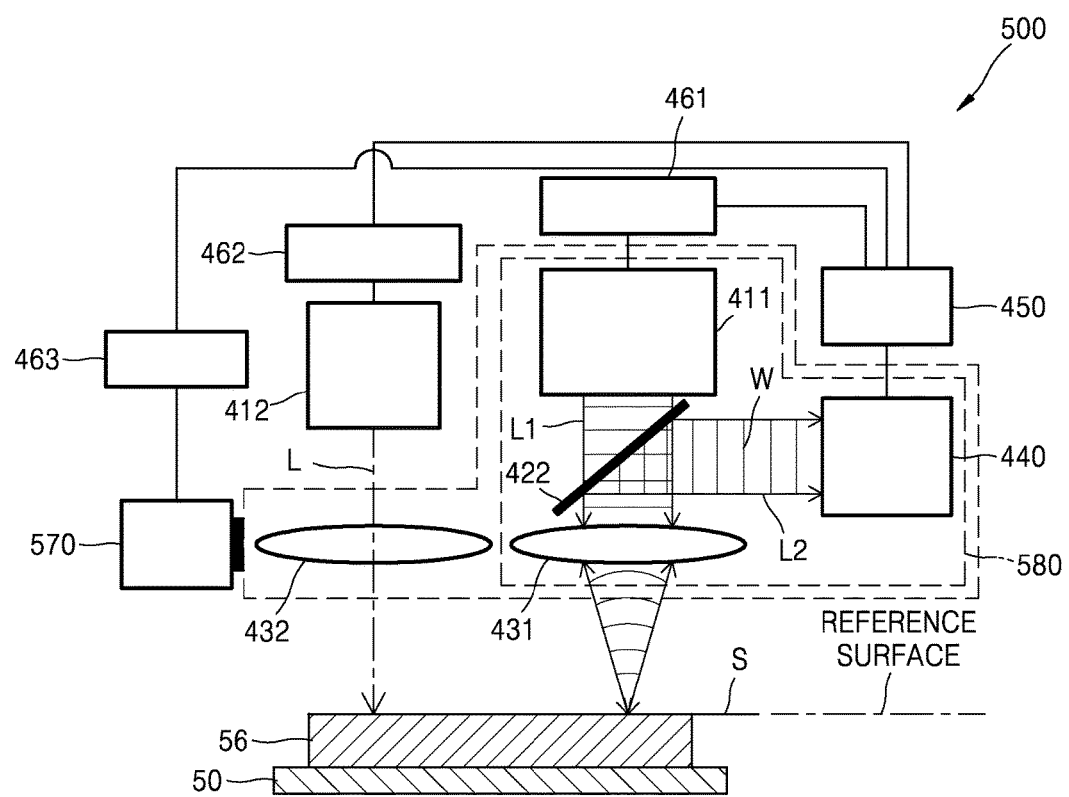
FIG. 10 is a view illustrating a laser processing device according to another example embodiment of the present invention.

FIG. 10 is a view illustrating a laser processing device 500 according to another example embodiment of the present invention. The laser processing device 500 of FIG. 10 is the same as the laser processing device 400 of FIGS. 9A through 9C except that a driver 570 moves the second light focusing unit 432 and a measuring device 580. Referring to FIG. 10, the driver 570 of the focus adjusting device may move the second light focusing unit 432 and the measuring device 580 upward and downward relative to the object 56 in order to adjust a focus of the laser light L. Although the calculation unit 450 is not included in the measuring device 580 moved by the driver 570 in FIG. 10, the calculation unit 450 may be included in the measuring device 580.

The driver 470 or 570 moves the second light focusing unit 432 upward and downward relative to the object 56 or moves the second light focusing unit 432 and the measuring device 580 upward and downward relative to the object 56 in the above embodiments. However, the present invention is not limited thereto, and the driver 470 or 570 may adjust the focus of the laser light L by moving upward and downward the stage 50.

While one or more embodiments have been described with reference to the figures, it will be understood by one of ordinary skill in the art that various changes in form and details may be made therein without departing from the spirit and scope as defined by the following claims.

The invention claimed is:

1. A laser processing device comprising:
   a measuring device configured to measure a change in a height of an object to be processed and comprising a first light source configured to emit probe light for measurement, a first light focusing unit configured to focus the probe light and emit the focused probe light to the object to be processed, a light sensing unit configured to detect a change in reflected light that is the probe light reflected from a reflective surface of the object to be processed and comprising a Shack-Hartmann sensor, and a calculation unit configured to calculate the change in the height of the object to be processed by using the change in the reflected light detected by the light sensing unit;
   a second light source configured to emit laser light for processing to the object to be processed; and
   a focus adjusting device configured to adjust a focus of the laser light emitted to the object to be processed by using the change in the height of the object to be processed measured by the measuring device.

2. The laser processing device of claim 1, wherein the laser light emitted from the second light source passes through the first light focusing unit and is emitted to the object to be processed.

3. The laser processing device of claim 2, wherein the focus adjusting device comprises a driver configured to move the first light focusing unit upward and downward relative to the object to be processed or move the measuring device upward and downward relative to the object to be processed.

4. The laser processing device of claim 3, wherein the focus adjusting device further comprises a controller connected to the calculation unit and configured to control an upward and downward movement of the driver.

5. The laser processing device of claim 2, wherein a dichroic mirror configured to transmit any one from among the probe light and the laser light and reflect remaining light is provided between the first and second light sources and the first light focusing unit.

6. The laser processing device of claim 5, wherein a beam splitter configured to transmit any one from among the probe light and the reflected light and reflect remaining light is provided between the first light source and the dichroic mirror.

7. The laser processing device of claim 6, wherein a wave plate and a bandpass filter are further provided between the dichroic mirror and the beam splitter.

8. The laser processing device of claim 1, further comprising a second light focusing unit configured to focus the laser light emitted from the second light source and emit the focused laser light to the object to be processed.

9. The laser processing device of claim 8, wherein the focus adjusting device comprises a driver configured to move the second light focusing unit upward and downward relative to the object to be processed or move the second light focusing unit and the measuring device upward and downward relative to the object to be processed.

10. The laser processing device of claim 9, wherein the focus adjusting device further comprises a controller connected to the calculation unit and configured to control an upward and downward movement of the driver.

11. The laser processing device of claim 8, wherein a beam splitter configured to transmit any one from among the probe light and the reflected light and reflect remaining light is provided between the first light source and the first light focusing unit.

12. The laser processing device of claim 1, wherein the Shack-Hartmann sensor is configured to detect a change in a wavefront of the reflected light.

13. The laser processing device of claim 12, wherein the calculation unit is further configured to calculate the change in the height of the object to be processed by using Zernike polynomials that represent the change in the reflected light detected by the light sensing unit as a formula.

14. The laser processing device of claim 13, wherein the change in the height of the object to be processed corresponds to a change in a coefficient value of a defocus term of the Zernike polynomials.

15. A laser processing method of processing an object to be processed by using a laser processing device comprising: a measuring device comprising a first light source configured to emit probe light, a first light focusing unit configured to focus the probe light and emit the focused probe light to the object to be processed, a light sensing unit configured to detect a change in reflected light that is the probe light reflected from the object to be processed and comprising a Shack-Hartmann sensor, and a calculation unit configured to calculate a change in a height of the object to be processed by using the change in the reflected light; a second light source configured to emit laser light; and a focus adjusting device configured to adjust a focus of the laser light, the method comprising:
measuring the change in the height of the object to be processed using the measuring device; and
adjusting the focus of the laser light emitted to the object to be processed by using the change in the height of the object to be processed measured by the measuring device using the focus adjusting device.

16. The method of claim 15, wherein the calculation unit is further configured to calculate the change in the height of the object to be processed by using Zernike polynomials that represent the change in the reflected light detected by the light sensing unit as a formula.

17. The method of claim 15, wherein a change in a height of a reflective surface corresponds to a change in a coefficient value of a defocus term of the Zernike polynomials.

18. The method of claim 15, wherein the laser light emitted from the second light source passes through the first light focusing unit and is emitted to the object to be processed.

19. The method of claim 18, wherein the focus adjusting device further comprises: a driver configured to move the first light focusing unit upward and downward relative to the object to be processed or move the measuring device upward and downward relative to the object to be processed; and a controller connected to the calculation unit and configured to control an upward and downward movement of the driver.

20. The method of claim 15, wherein the laser light emitted from the second light source is focused by a second light focusing unit and is emitted to the object to be processed.

21. The method of claim 20, wherein the focusing adjusting device further comprises: a driver configured to move the second light focusing unit upward and downward relative to the object to be processed or move the second light focusing unit and the measuring device upward and downward relative to the object to be processed; and a controller connected to the calculation unit and configured to control an upward and downward movement of the driver.

* * * * *